United States Patent [19]
Volk et al.

[11] 3,708,677
[45] Jan. 2, 1973

[54] METHOD AND APPARATUS FOR RETRIEVING CODED INFORMATION ON FILM

[75] Inventors: Joseph A. Volk; Joseph A. Volk, Jr., both of St. Louis, Mo.

[73] Assignee: Beta Corporation, St. Louis, Mo.

[22] Filed: July 29, 1970

[21] Appl. No.: 59,277

[52] U.S. Cl. ............... 250/219 DR, 356/71, 242/75, 242/52, 353/26
[51] Int. Cl. ............................................. G08c 9/06
[58] Field of Search ...... 250/219 D, 219 DF, 219 FR; 242/75.52; 340/174.1 A, 174.1 C; 226/33; 352/25, 26, 120; 356/71; 353/26

[56] References Cited

UNITED STATES PATENTS

| | | | |
|---|---|---|---|
| 3,581,964 | 6/1971 | Betron et al. | 226/33 |
| 2,295,000 | 9/1942 | Morse | 250/219 FR X |
| 3,323,700 | 6/1967 | Epstein et al. | 250/219 DR X |
| 3,354,367 | 2/1971 | Wanner et al. | 226/33 |
| 3,562,494 | 2/1971 | Schmidt | 250/219 C X |
| 3,322,961 | 5/1967 | Harrison et al. | 250/219 DR |
| 3,290,987 | 12/1966 | James et al. | 356/71 X |

Primary Examiner—Walter Stolwein
Attorney—Rogers, Ezell, Eilers & Robbins

[57] ABSTRACT

This invention comprises a method and apparatus for retrieving coded information recorded on film and includes a film transport means for driving the film at a relatively high velocity, means for programming a selected code variation for comparison with the code variations on the film, and means for stopping the film on the information relating to the programmed code variations.

20 Claims, 13 Drawing Figures

INVENTORS:
JOSEPH A. VOLK,
JOSEPH A. VOLK, JR.

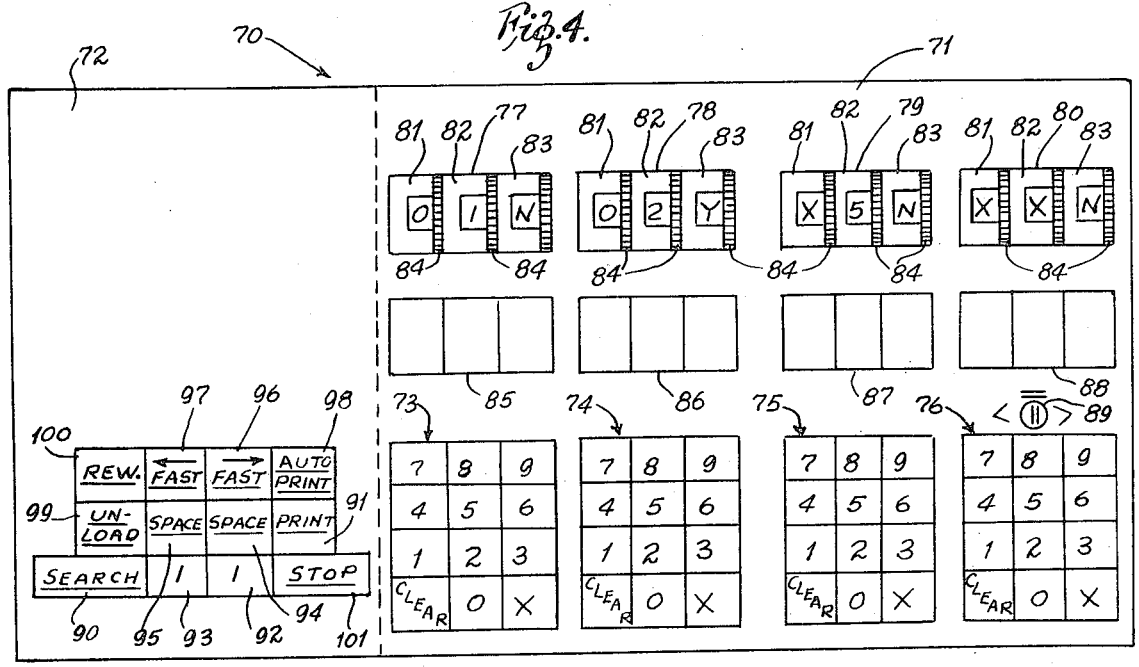

Fig. 4.

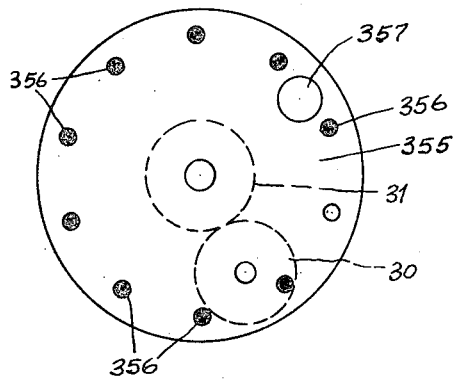

| Fig. 6. | | FEED | CAPSTAN | TAKE-UP |
|---|---|---|---|---|
| SEARCH | HIGH SPEED FORWARD ≡ | NO CLUTCH DRAG BRAKE | NO CLUTCH NO BRAKE | CLUTCH NO BRAKE |
| | LOW SPEED FORWARD ≡ | NO CLUTCH DRAG BRAKE | CLUTCH NO BRAKE | DRAG CLUTCH NO BRAKE |
| | STOP ≡ | NO CLUTCH BRAKE | NO CLUTCH BRAKE | NO CLUTCH BRAKE |
| | LOW SPEED REVERSE ≡ | DRAG CLUTCH NO BRAKE | CLUTCH NO BRAKE | NO CLUTCH DRAG BRAKE |
| | HIGH SPEED REVERSE ≡ | CLUTCH NO BRAKE | NO CLUTCH NO BRAKE | NO CLUTCH DRAG BRAKE |

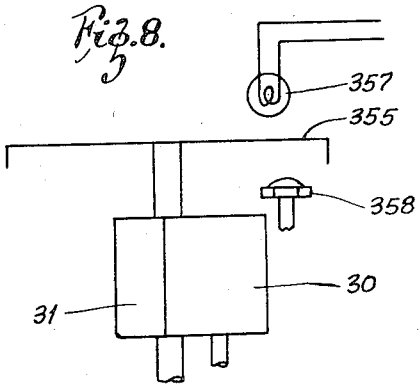

INVENTORS:
JOSEPH A. VOLK,
JOSEPH A. VOLK, JR.
BY Rogers, Ezell, Eilers & Robbins
ATTORNEYS

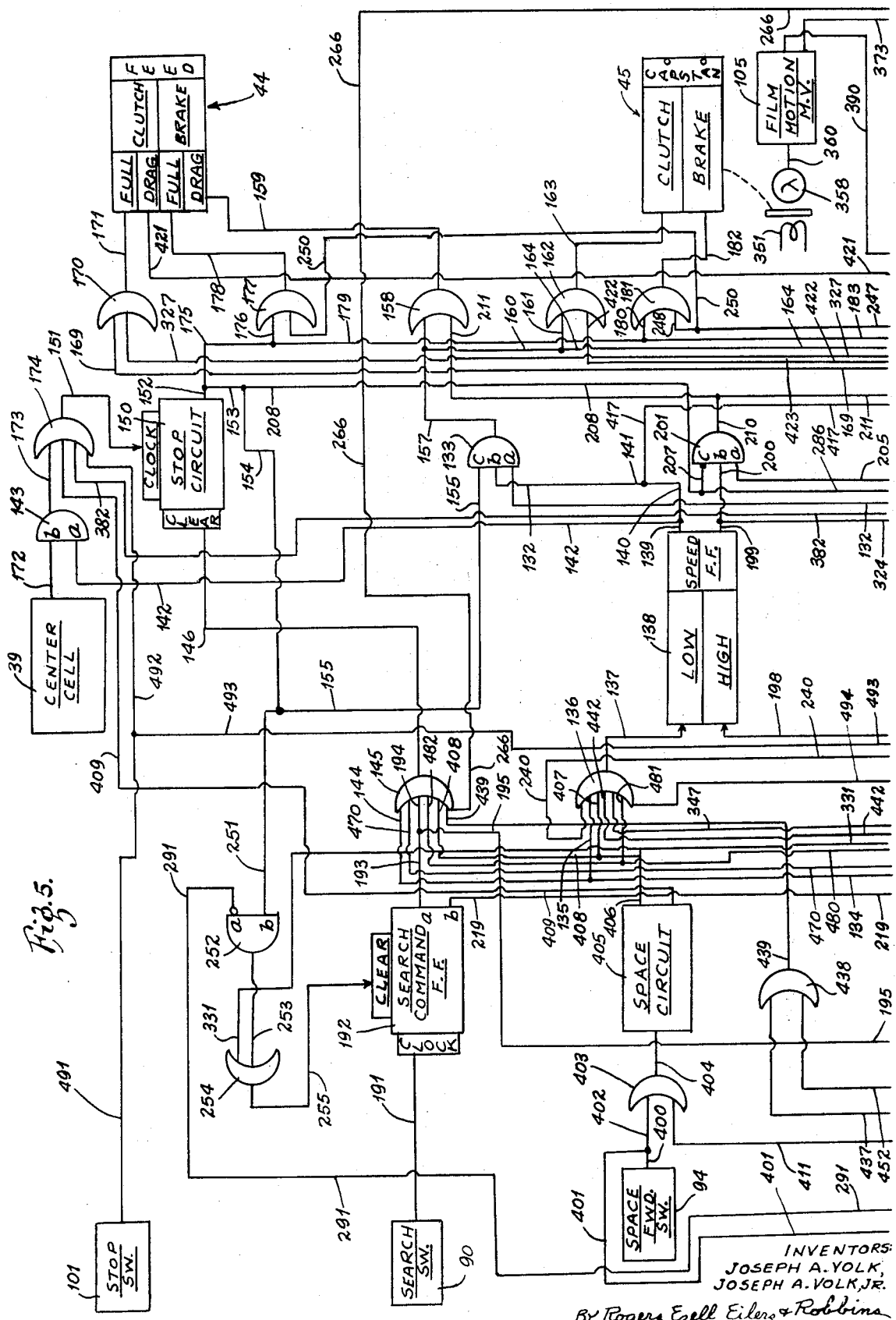

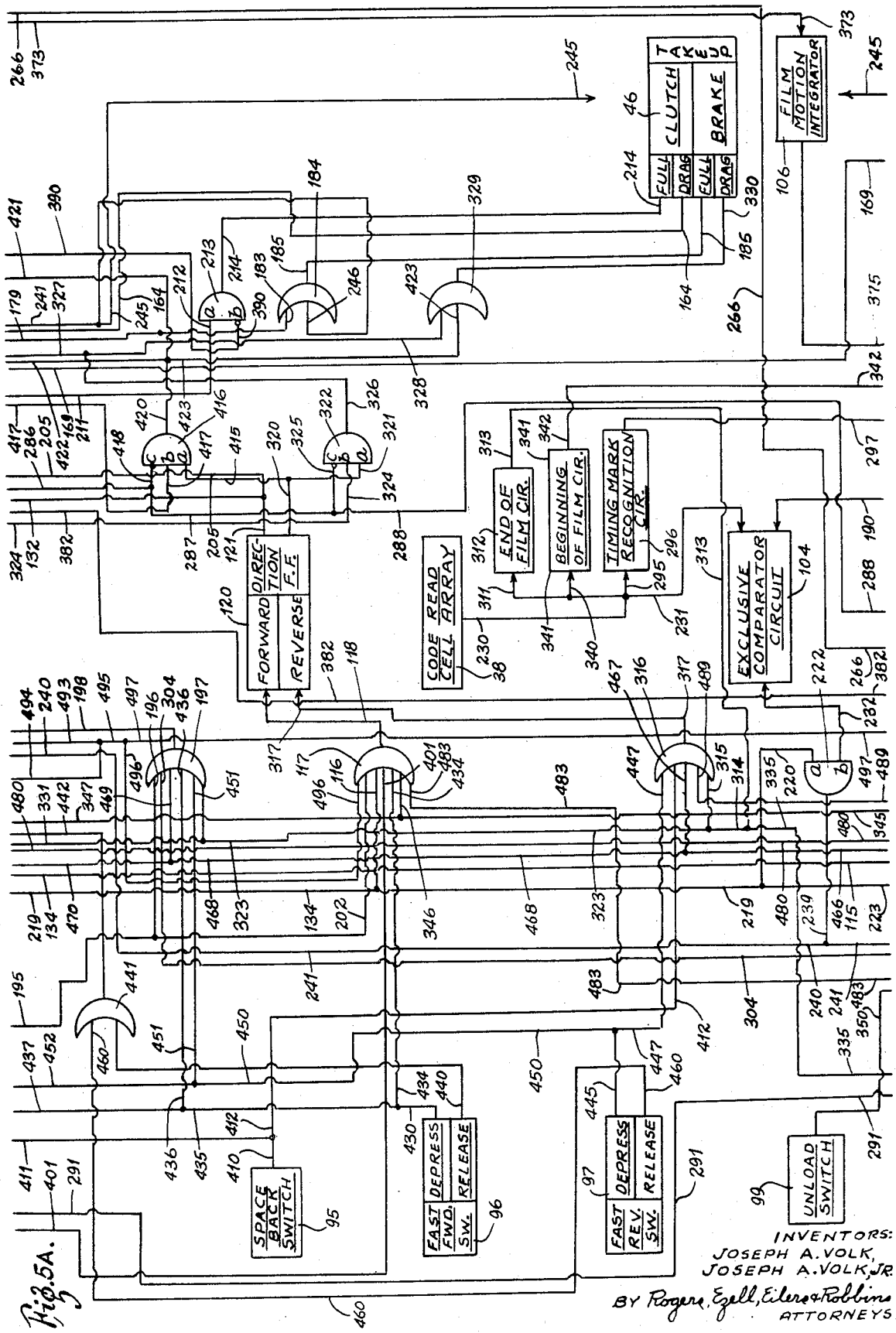

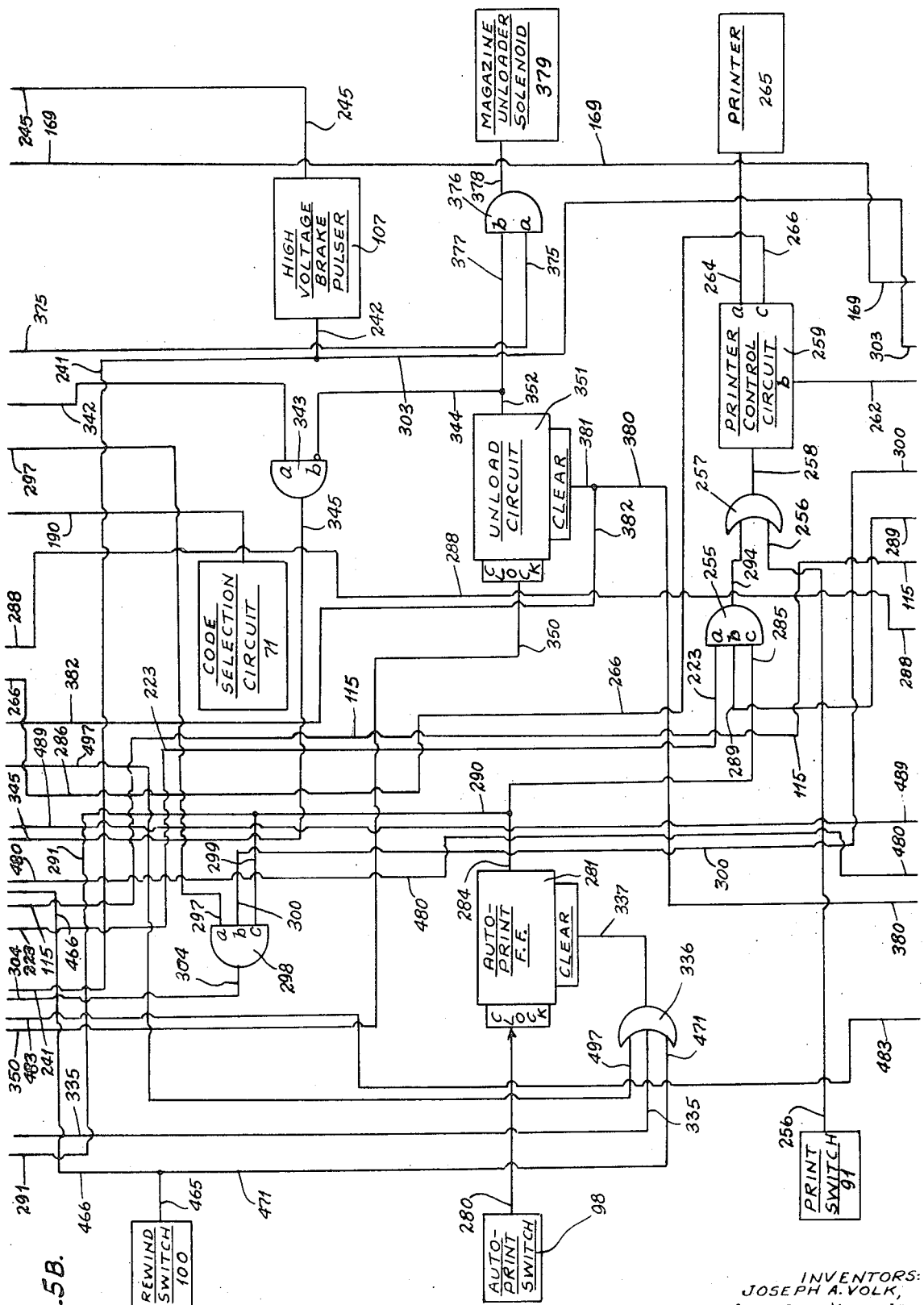

Fig. 5C.

METHOD AND APPARATUS FOR RETRIEVING CODED INFORMATION ON FILM

BACKGROUND OF THE INVENTION

Because of the great quantities of written and printed materials generated, the availability of storage space for these materials has become increasingly critical. The result has been great demand for a system of recording documents (those which must be saved) on film such as microfilm. Because microfilm requires so little space for storage, hundreds of times the number of documents can be stored on microfilm in the same space as previously used to store the original documents.

However, just as important as the microfilm technique for storing these documents is the ability to quickly and accurately retrieve the stored information. For example, where documents comprise large sets of statistical data it is desirable to classify and code these documents.

Coded microfilm is old in the art. An example is a roll of 16 millimeter microfilm with a set of documents recorded thereon. The documents might be related or unrelated. Before each document or series of documents is printed a coded field, which as will be seen, is related to the information contained in the document or series of documents that immediately follow, and is used as a means for document selection.

These rolls of microfilm are packaged in cartridges, and are run through a machine at a relatively high rate of speed (approximately 125 inch per second). In operation, the operator of the machine first selects from a code index the code of interest. The machine has a control panel on which the operator enters the selected code. By then pressing the appropriate mode switch, the machine will search the roll of microfilm at approximately 125 inch per second and eventually stop on the first document identified with the programmed code. Means are provided for projecting the document onto a view screen and for making a print of the document. The machine can then be made to continue its search for further documents pertaining to that same code or a different code. Such a machine can be made to handle thousands of code variations and randomly select all documents pertaining to each variation. Such a machine is commonly referred to as a random access machine.

One of the great problems found in the prior art machines, due primarily to their random access capability and their high film speed, is their inability to recognize a particular code and stop on the next document. This problem is most easily visualized when it is realized that the distance between a particular code column and its first associated document might be only about ⅜ of an inch. None of the prior art machines have the capability of recognizing the code column that matches the programmed code and immediately stopping the film which is traveling at approximately 125 inch per second on the next document which might be only a ⅜ inch away. As a result, the prior art devices either do not have the random access capability or have made no attempt to stop the film that quickly. For example, one of the prior art devices operates by first recognizing the appropriate code column, stopping the machine after it has gone past the associated document, clocking the distance past the document the film travels and placing the machine in low speed reverse to back up the appropriate distance to the document. Of course, the disadvantage to this system is that it requires several additional seconds to find the document. Where the operator is interested in several documents, or where he must search several rolls of microfilm, these few seconds add up to a substantial time loss.

Therefore, it would be far superior to have a system that can recognize a code column and immediately stop at the next document without having to overrun the document and then back up to it. This invention provides such a system.

SUMMARY OF THE INVENTION

The system of this invention provides the capability of searching a roll of film on which certain coded information has been recorded in the form of document images, and randomly selecting those document images pertaining to a particular code variation. Before each document image or series of document images are code means having one or more code variations relating to the image or series of images that immediately follow. A film transport system drives the film at high speed (approximately 120–150 inches per second) past a document window. Means are provided for reading the code variations on the film as it travels in this high speed condition. This code information is fed into an exclusive comparator means.

Also provided is a means for programming a preselected code variation into the exclusive comparator means for storage and comparison with the code variations on the film. When the exclusive comparator means recognizes correspondence between the programmed code variation and a code variation on the film, the film speed is immediately reduced to a relatively low value after which the film is made to stop with the next document centered in the document window. This slowing of the film, is accomplished by generating a relatively narrow-high voltage pulse when such correspondence is obtained, and by applying this pulse to brake the transport means. This narrow-high voltage pulse produces extreme braking action for a very short time which instantaneously slows the film to a much-reduced speed whereupon it can be stopped on the next document without overrunning the document.

Means are also provided for controlling the speed of the film to within preselected limits by sensing the film speed and disengaging the film drive means when the film speed becomes excessive. In addition, the machine of this invention is provided with a variety of modes, both automatic and manual. These are used for a variety of purposes in the film searching sequence.

BRIEF DESCRIPTION OF THE DRAWINGS:

FIG. 4 illustrates a typical control panel for the system of this invention;

FIGS. 5 – 5C are block diagrams of the general logic circuitry of this invention;

FIG. 6 is a chart showing the brake and clutch conditions of the feed reel, capstan and take-up reel for the various system modes;

FIGS. 7 and 8 illustrate the film speed sensing device of this invention;

Figure 1:
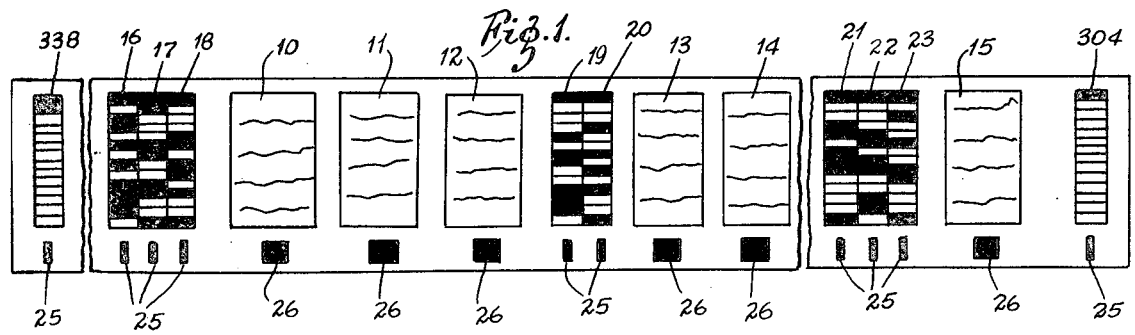
FIG. 1 illustrates a typical film to be searched by the system of this invention.

DETAILED DESCRIPTION OF THE PREFERRED EMBODIMENT:

Before describing the invention in detail, it will be helpful to describe generally how the machine operates. The machine is designed to read microfilm such as that shown in FIG. 1. The microfilm has recorded on it certain documents, 10, 11,12,13,14, and 15, which have been arranged in a preselected manner, each document or series of documents being preceded by one or more code columns. The documents 10,11, and 12 are preceded by code columns 16,17, and 18; the documents 13 and 14 by code columns 19 and 20; and the document 15 by code columns 21, 22 and 23. There can be any number of code columns preceeding any number of documents. Beneath each of the code columns is a timing mark 25, and beneath each document is a document mark 26. The document marks 26 are over twice as wide as the timing marks 25. The purposes of the timing and document marks will be hereinafter described.

Figure 2:
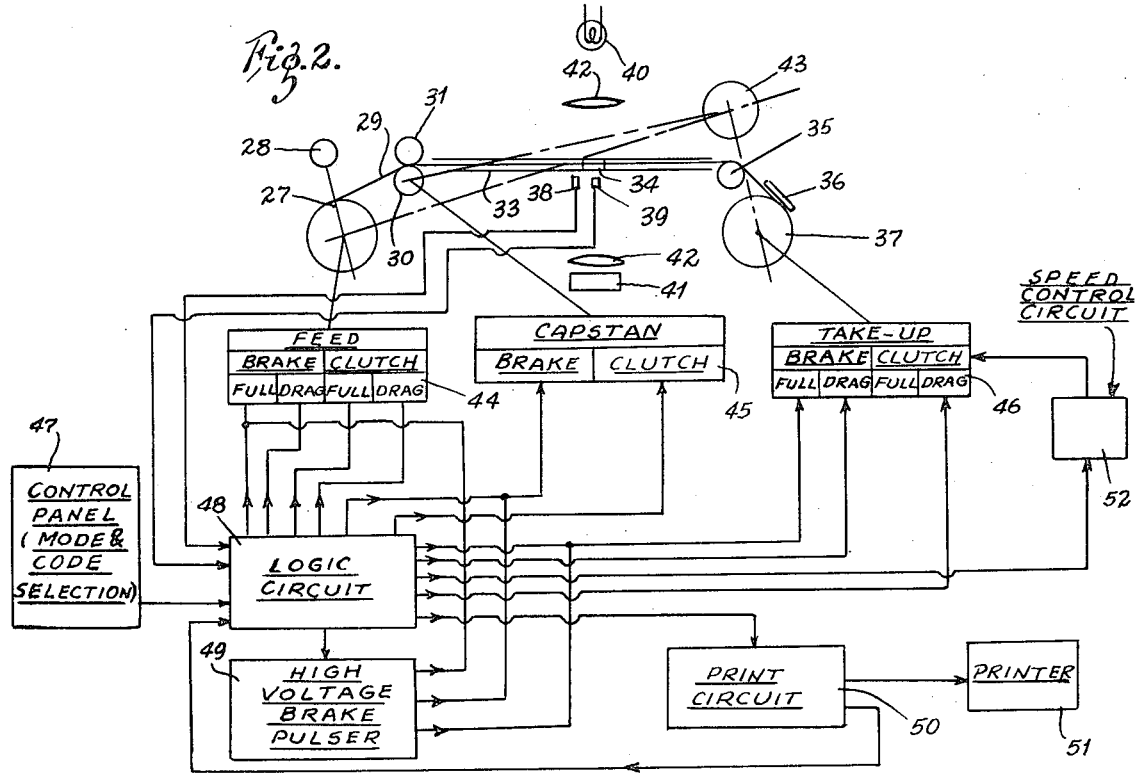
FIG. 2 is a general block diagram of the system of this invention including the essential features of the film transport system.

Referring to FIG. 2 there is illustrated the mechanical features of the machine in schematic form together with a very general block diagram of the system. As shown, there is a feed spool 27 containing the roll to be searched and having associated therewith a magazine lock 28 for holding the magazine on the spool. The film 29 is fed past a capstan 30 and pinch roller 31, through a film guide 33, and past a document window 34. The film 28 then feeds past a guide roller 35 and guide bar 36, and onto a take-up reel 37. Positioned only about ½ inch from the center of the document window 34 is a photocell array 38, and positioned approximately in the center of the document window 34 and in alignment with the document marks 26 on the film 29 are two center cells 39. Positioned in front of the document window 34 is a projection lamp 40 for projecting the image of a selected film frame onto a mirror 41 for projection onto a viewing screen and/or printing paper (not shown). Suitable optics 42 are also provided for this purpose. A motor 43 is provided for driving the feed reel 27, capstan 30, and take-up reel 37, in either the forward or reverse direction, and in either high or low speed. In high speed the film 29 travels approximately 125 inch per second, while in low speed it travels approximately 2–4 inches per second. The feed reel 27, capstan 30, take-up reel 37, motor 43, and film guides 33 and 35 are generally referred to as the film transport system.

Each of the feed reel 27, capstan 30, and take-up reel 37 is provided with a clutch and a brake assembly which are referred to generally in the blocks shown in FIG. 2. These components are not described in detail as they are standard items, but each is an electromagnetic device operated by the application of a specified voltage on their respective coils. Hence, the feed reel 27 has a brake and clutch assembly 44, the capstan 30 a brake and clutch assembly 45, and the take-up reel 37 a brake and clutch assembly 46.

In the case of the capstan 30, the brake and clutch can each only be applied in full or not at all; however, the brakes and clutches of the feed reel 27 and the take-up reel 37 can be applied in full, in a drag condition, or not at all. Hence, the feed reel, capstan and take-up reel can have various combinations of braking and clutching as the situation requires. As will be seen, this depends on whether the system is in forward or reverse and whether it is in a low speed, high speed or stop condition.

The system is provided with a control panel 47 for selecting the desired mode and code conditions. Signals from the control panel are transmitted to a logic circuit 48 which includes an exclusive comparator circuit for comparing the code selection with the code columns on the microfilm 29. The code columns on the microfilm are read by the photocell array 38. Where a match occurs between the selected code from the control panel 47, and a code on the microfilm 29, the exclusive comparator circuit generates a "HIT" signal, which signal is used among other things, to trigger a high voltage brake pulser 49. This circuit in turn, generates a high voltage signal for only a small fraction of a second which is applied to the brake coils of the feed reel 27, capstan 30, and take-up reel 37. It is this high voltage pulse which so quickly applies the brakes to kill the inertia in the system allowing the film to stop on the next document. This will be described in more detail below. The logic circuit performs many other functions which will also be described in more detail below. For example, in certain modes it will trigger a print circuit 50 which will cause operation of a printer 51. It also selects the proper combination of feed reel, capstan, and takeup reel clutching and braking corresponding to its mode and code selection inputs. These operations are shown in the block diagram of FIGS. 5 through 5C.

Because a feature of this invention is to stop the film on the next document after obtaining a HIT signal, it is necessary to prevent the film speed from running away or becoming too fast. Because the diameter of the film roll increases as film is collected on the take-up reel, the film speed will increase. If the speed becomes too great it becomes impossible to stop the film on the next document. In other words, the document will run past the document window 34. To prevent this, a speed control circuit 52 is included for controlling the film speed. As will be seen, this is accomplished by sensing the rotational speed of the capstan 30, and controlling the application of the clutch on the take-up reel 37. By controlling the engagement of the clutch, the speed of the take-up reel 37 can be controlled and, hence, the speed of the film 29.

Figure 3:
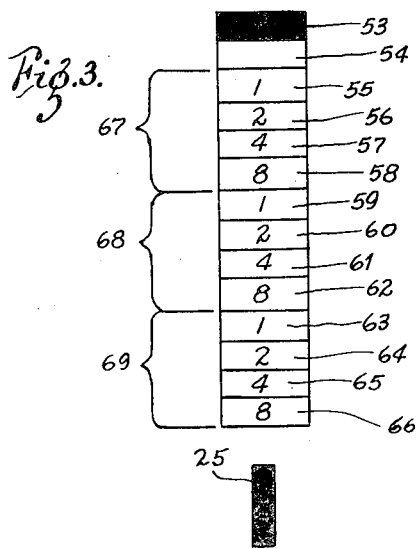
FIG. 3 illustrates a typical code column and timing mark used for coding the film of FIG. 1.

A description of the code programming and mode selection follows. In FIG. 3 there is shown an enlarged view of a typical code column like the code columns 16–23 shown on the film strip of FIG. 1. As can be seen, each code column has 14 bits, 53–66. These bits will be described from the top down. The top bit 53 is called the parity bit which is not used in the system of this invention. The next bit 54 is the utility bit, the purpose of which will be hereinafter described. The remaining 12 bits 55-66, are divided into three, four-bit groups, 67,68, and 69. The first group 67 being the units group, the second group 68, the tens group, and the third group 69, the hundreds group. The four bits in each group, moving from top to bottom, represent in order, the numbers 1,2,4, and 8. Hence, the units group 67 has four bits 55-58 representing the numbers 1,2,4, and 8; the tens group 68 has four bits 59-62 representing the numbers 1,2,4, and 8 and the hundreds group 69 has four bits 63-66 representing the numbers 1,2,4, and 8. This system is commonly known in the art.

The code bits within any one of the groups 67,68 and 69 can be combined to represent any number between zero and 15. Using the units group 67 as an example, the bits 55 and 56 can be combined to represent a 3; the bits 56 and 57 can be combined to represent a 6; the bits 55 and 58 can be combined to represent a 9; and so on, to obtain any number between zero and 15. The same, of course, can be done with the tens group 68 and the hundreds group 69. As will be seen, only the bits representing the numbers zero through 9 in each of the groups are used for code selection purposes. The number 15 is used, however, to recognize the beginning and ending of a film roll as will be described. By limiting the usable numbers to 0 – 9, in each of the groups, any number between 0 and 999 can be represented on each of the code columns.

The variations in code are obtained by blacking out appropriate bits. Examples of code variations are shown in the various code columns in FIG. 1. For example, assuming negative film, the code column 16 represents the number 854, and the code column 17 the number 667. If assuming positive film, the code column 19 represents the number 734, and the code column 20 the number 952. A switch (not shown) is provided to select the type of film being read i.e. positive or negative film. By using or not using the utility bit 54, the number of code variations in one code column is effectively doubled. As previously stated, the parity bit 53 is not used.

In FIG. 4 there is shown a portion of a control panel 70 used in this invention. The panel 70 includes a code selection section 71 and a mode selection section 72. The code section 71 is comprised of four sets of code buttons, 73, 74, 75, and 76. Each of the code button sections has buttons corresponding to the numbers 0 – 9, a Clear button, and an X button. The buttons labeled 0 – 9 in each of the button sections correspond to the code variations 0 – 9 in each of the units, tens, and hundreds sections 67,68, and 69 of the code columns.

Each button set has a corresponding column selector. The button set 73 has a column selector 77, the button set 74 has a column selector 78, the button set 75 has a column selector 79, and the button set 76 has a column selector 80. Each of the column selectors 77-80 has switches 81 and 82 which can be set to read any number between zero and 99. Each of the switches 81 and 82 can also be set to read an X. As will be hereinafter described an X means "any" number between zero and 9. Each column selector also has a third switch 83, for selection of the utility bit 54. The switch 83 is a two-position switch with the symbol Y designating the use of the utility bit and the symbol N non-use of the utility bit. The switches 81,82, and 83 are set with appropriate knobs 84. The purpose for the column selectors 77-80 will be hereinafter described.

Each button set 73-76 also has a corresponding code selection indicator. The button set 73 has a code selection indicator 85; the button set 74 has a code selection indicator 86; the button set 75 has a code selection indicator 87, and the button set 76 has a code selection indicator 88. The three-digit numbers programmed in the button sections 73-76 will appear in the indicators 85-88, respectively.

Any number between zero and 999 can be programmed in each of the button sections. Using button section 73 as an example, suppose the operator desires to program the code number 385 without the utility bit 54. He pushes the 3 button in that button section which programs a 3 in the hundreds column of the exclusive comparator circuit. He then pushes the 8 button which programs an 8 in the tens column of the exclusive comparator circuit. He then pushes the 5 button which programs a 5 in the units column of the exclusive comparator circuit. The buttons are spring loaded so that they will automatically release after pushed. The numerals 385 will appear in the selection indicator 85 to indicate that the desired code has been programmed. The exclusive comparator circuits receive the information from the memory unit of the keyboard which stores the programmed code for comparison with the code columns on the film. The operator then sets the switches 81 and 82 of the column selector 77 to indicate the code column at which he desires to recognize the programmed code. In this regard it must be remembered that there can be any number of code columns before a document or set of documents. For example, there could be 83 code columns before a single document. This would occur, for example, where the document contains information relating to each of 83 different code variations. However, the operator may be interested in that document only if the 28th code column corresponds to his programmed code. If this is true, he will enter the number 28 in the column selector. He will also program non-use of the utility bit 54 by setting the switch 83 to the "N" position. With the machine so programmed, a HIT will be generated, and, hence, a document selected, only where a 28th code column before any document or set of documents contains the code variation corresponding to the programmed code 385 without the utility bit. The switches 81 and 82 can be set to recognize any code column from 1 to 99 or any of several code columns by using an "X" setting. Hence, with the switch 81 set to designate column "X" and the switch 82 set to designate column 3, the machine would recognize any of columns 3,13,23,33,43, 53,63,73,83, and 93. If both switches 81 and 82 are set to the "X" positions, the machine will recognize any column where correspondence occurs.

The other button sections 74-76 operate in the same manner; however, button section 76 has an additional capability. This button section has a three-position switch 89 which by selecting the appropriate position will allow the machine to recognize only the programmed code, all codes less than the programmed code, or all codes greater than the programmed code. A switch (not shown) is also provided to select all keyboards for a match or any keyboard for a match to produce a HIT signal. If the operator programs all four button sections and their corresponding column selectors, code variations in the billions can be obtained. Obviously, very precise information can be retrieved by using all four sections.

By way of example, to illustrate the technique, supposing the personnel manager of a company wants copies of personnel records for all employees who have the name John P. Jones, are 5 foot 10inches tall, weight 165 lbs., and are 35 years of age, This information might be coded as follows: John P. Jones might have a code 385; the 3 corresponding to John, the 8 corresponding to P., and the 5 corresponding to Jones. His height, 5 foot 10inches, might be coded as 510. His weight, 165 lbs., might be coded 165, and his age, 35, might be coded 35. The operator would program 385 into the first button section 73, 510 into the second button section 74, 165 into the third button section 75, and 035 into the fourth button section 76. These numbers will appear in the indicators 85–88, respectively. For the purpose of this example, assume that the code columns where the corresponding code variations is found make no difference. Since this is true, the switches 81 and 82 of each of the column selectors 77–80 would be set to read "XX." Also, since he is interested in those only at an age of 35, he would set the position switch 89 to the "equal" position. The panel is now programmed to retrieve the information he desires. Supposing, however, he is interested in the same information except that instead of those at an age of 35 he is interested in all of those at an age less than 35. This information is retrieved by simply setting the position switch 89 to the "less than" position. If he is interested in those at an age over 35 he would set the switch 89 to the "greater than" position.

Each of the button sections has an X button (the "X" again meaning "any") which can be used in place of the units, tens and hundreds digits as desired to mean any number between 0 and 9. Again, using button section 73 as an example, if the code number X21 is programmed into the machine, the machine will recognize any code column having one of the code combinations 021,121,221, 321,421,521,621,721,821, and 921. To illustrate a particular use for the X button, again consider the information desired by the personnel manager. Supposing instead of only John P. Jones, he is interested in all John Jones'. Instead of using the code 385 as before, he would program the code 3x5. The X meaning any John "X" Jones.

All of the buttons and switches thus far described send signals to the exclusive comparator circuit where they are stored and used to recognize the correspondence or lack of correspondence between the stored information and the code variation on the microfilm code columns. Only where correspondence occurs is a HIT signal generated by the exclusive comparator circuit and only then will the machine automatically stop on a document. On each of the button sections 73–76 is a clear button which when pushed generates a signal to the exclusive comparator circuit to clear the stored information so that a different code variation can be programmed.

With the machine programmed it is necessary to transport the film through the machine. This can be accomplished by selecting the appropriate operating mode from the mode selection section 72 of the control panel 70. For a better understanding of the detailed description of the logic circuitry, the operation of the machine will be generally described in each of the mode settings.

To operate the transport system a film cartridge is placed on the feed reel 27. With the cartridge in place, a switch (not shown) beneath the cartridge is automatically set to start operation of the transport system. The system goes into low speed forward, threading the film through the film guide 33 and onto the take-up reel 37. This operation continues until the first document mark 26 on the film 29 is recognized by the center cells 39. When this occurs the film automatically stops with the first document centered in the document window 34.

With the machine programmed, the object is to search the entire roll of film for code variations in the code columns corresponding to the programmed code. To accomplish this the operation presses a search button 90 which generates a signal to place the machine in high speed forward. In this mode the film speed is approximately 125–150 inches per second. If a "HIT" is obtained the high voltage brake-pulser 49 generates a relatively narrow, but high voltage pulse to apply full brake to the feed reel 27, capstan 30, and take-up reel 37. The machine will then go into low speed forward and stop at the next document. From the time the HIT signal is obtained to the time the machine stops on the next document, the film may travel as little as ⅝ of an inch.

With the machine stopped on the first document after a HIT signal is obtained, the document positioned in the document window 34 is projected by the projection lamp 40 onto a view screen (not shown). A print button 91 is provided, which when pushed will operate the printer 51 for providing a print of the document.

There may be a series of documents following the code field where the HIT was obtained, rather than just one. If this is true, the operator may wish to view and/or print each of the documents in the series. To accomplish this he pushes a "1" button 92, which generates a signal to move the film in low speed forward to the next document in the series. Again, he can view and/or print the document. This operation can be continued by simply pressing and releasing the "1" button 92. If he wishes to look again at a document in the series which he has already viewed, he pushes and releases a "1" button 93, causing the film to move in low speed reverse to the next document. If either of the "1" buttons is pushed and held, a series of signals will be generated which will move the microfilm in low speed in either the forward or reverse direction (depending on which "1" button is pushed), to stop on the next document for approximately 1 ½ seconds and then automatically move on to the next document and so on, until either the "1" button is released, or there are no more documents in the series. The operator can go back into the search mode at any time by pressing the search button 90.

Also provided in the mode selection section is a pair of spaced buttons 94 and 95, which when pressed, will generate a signal to drive the film in low speed and in small increments, these increments being a small fraction of the distance between documents. The space button 94 will move the microfilm in small increments in the forward direction and the space button 95 will move the microfilm in small increments in the reverse direction. These buttons are particularly useful in centering the documents in the document window 34 should the need arise.

A pair of fast buttons 96 and 97 are also provided, which, while pressed generate signals that drive the film 29 at high speed in either the forward or reverse direction. Hence, the fast button 96 while pressed, generates a signal that drives the film 29 in high speed forward, and the fast button 97 while pressed drives the film in high speed reverse. These buttons are used, for example, where the operator wishes to quickly advance or rewind the film a specified amount.

An auto-print button 98 is used in conjunction with the search button 90 to generate a signal placing the machine in an automatic print mode. In this mode the machine will automatically print any document on which the machine stops. At the completion of the print it will cause the machine to drive the film in low speed forward to the next document where a print will automatically be made of that document. This will continue until there are no more documents in the series. At the end of the series the machine again moves into the high speed forward in search of further code correspondence. If another HIT is generated, the documents in the series to follow (if there be a series) will again be automatically printed in succession. This will continue until entire roll of film is searched. The auto-print mode in effect, relieves the operator from having to use the print and "1" buttons to make prints of a series of documents.

In the search mode, the machine of this invention searches through the entire roll of film, stopping on a document whenever a HIT signal is generated. The search for these documents is made at high speed. After the entire roll has been searched the machine will recognize the end of the film and automatically go into high speed reverse or rewind. The machine will then recognize the beginning of the film, automatically reverse direction into low speed forward and proceed to the first document whereupon it again stops. In other words, by pushing the search button, the machine will search through the film, automatically go into high speed reverse at the end of the film, automatically go into low speed forward at the beginning of the film, and stop at the first document.

The machine will not unload the film by pressing the search button. In order to unload the film, an unload button 99 is provided which, when pushed generates a signal to cause the film to be wound entirely on the film cartridge after the rewind operation. A sensor recognizes when the film is completely rewound and a signal is generated to automatically eject the film cartridge from the feed reel 27.

A rewind button 100 is provided which, when pushed will cause the machine to rewind the film 29 from any position in the roll back to the first document. The rewind mode would be used where the operator is only a portion of a way through the film, but wishes to return to the first document without having to first go to the end of the roll.

A stop button, 101, will, when pushed, cause full brake to be applied to the fed reel 27, the capstan 30, and the take-up reel 37 to instantaneously stop the machine regardless of the mode in which it is operating.

With this general understanding of the operation and performance of the machine, a detailed description of the logic circuitry follows.

Figure 5C:
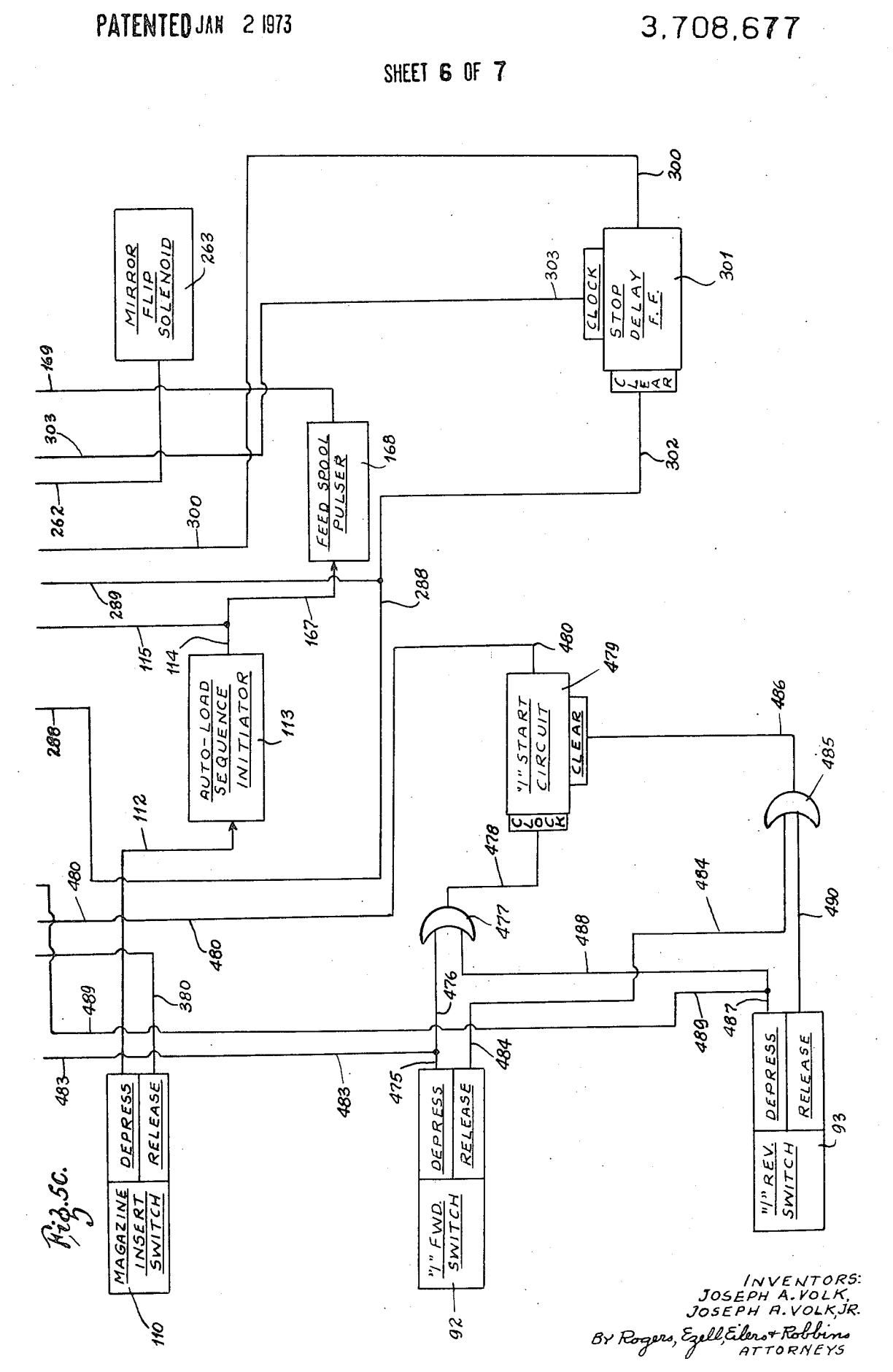

Viewing FIGS. 5 – 5C as one figure there is shown a more detailed block diagram of this invention. On the left of the figure are a series of blocks aligned vertically which correspond to the mode selection switches 90–101 shown in FIG. 4. On the upper right of the Figure are blocks representing the brake and clutch assemblies 44, 45, and 46 of the feed reel 27, capstan 30, and take-up reel 37 similar to those shown in FIG. 2. The clutch and brake of the feed and take-up reels 27 and 37 can be applied in full or drag as heretofore described. Conductors go to each clutch and brake section and it is to be understood that a signal on a particular conductor means that the clutch or brake is operated accordingly. Hence, if a signal appears on the conductor going to the drag clutch section of the feed reel block 44 it is to be understood that a drag clutch is applied to the feed reel 27, and so on. Located generally in the center of the Figure are blocks representing the cell array 38, which, as previously explained, is located just to the feed reel side of the document window 34, an exclusive comparator circuit 104, and the code selection circuit 71 that corresponds to the code selection section 71 of the control panel 70. Located on the right of the Figure are the capstan motion monostable multivibrator 105, film motion integrator 106, and high voltage brake pulser 107. These last three circuits represent important features of this invention. The functions of these and the other blocks shown in FIGS. 5 – 5C will be described as the detailed description progresses.

FIG. 6 shows a chart giving the condition of the brakes and clutches of the feed reel 27, capstan 30, and take-up reel 37 for each mode condition. As the chart shows when the machine is in high speed forward, the feed reel 27 has no clutch and drag brake, the capstan 30 has no clutch and no brake, and the take-up reel 37 has full clutch and no brake. In low speed forward the feed reel 27 has no clutch and drag brake, the capstan 30 has full clutch and no brake, and the take-up reel 37 has drag clutch and no brake. In the stop mode each of the feed reel 27, capstan 30, and take-up reel 37 has no clutch and full brake. In low speed reverse the feed reel 27 has drag clutch and no brake, the capstan 30 has full clutch and no brake, and the take-up reel 37 has no clutch and drag brake. In high speed reverse the feed reel 27 has full clutch and no brake, the capstan 30 has no clutch and no brake, and the take-up reel 37 has no clutch and drag brake. These clutch and brake combinations have been found best for controlling the film in each of the mode conditions.

LOADING

When a film cartridge is inserted into the feed reel 30 a magazine insert switch 110 is automatically depressed. The depression of the switch 110 sends a signal in a conductor 112 to an auto-load sequence initiator 113. The auto-load sequence initiator 113 in turn, generates a signal which is fed through an output conductor 114, a conductor 115, a conductor 116, an OR gate 117, and a conductor 118 to the forward input of a flip-flop 120. The flip-flop 120 has a forward condition and a reverse condition. Whenever a signal is present on the conductor 118 the flip-flop 120 is placed in its forward condition. The flip-flop 120 controls the direction of rotation of the motor 43, and hence, direction of travel of the film 29. With the flip-flop 120 in the forward condition the signal is fed through a conductor 121 and a conductor 132 to the input a of an AND gate 133. The signal on the conductor 115 is also fed through a conductor 134, a conductor 135, an OR gate 136, and a conductor 137 to the low speed input of a flip-flop 138. The flip-flop 138 has a low speed condition and a high speed condition. Where a signal appears on the conductor 137 the flip-flop 138 is placed in the low speed condition. It is the flip-flop 138 that controls the film speed. With the flip-flop 138 in the low speed condition a signal is fed through a conductor 139, a conductor 140, and a conductor 141 to the b input of an AND gate 133. The signal on the conductor 139 is also fed through a conductor 142 to the input a of an AND gate 143. The signal on the conductor 134 is also fed through a conductor 144, an OR gate 145, and a conductor 146 to the clear input of a stop circuit 150. Hence, anytime a signal appears on the conductor 146, the stop circuit 150 will be cleared. As will be hereinafter described, the stop circuit has another input conductor 151. Whenever a signal appears on the conductor 151 the stop circuit 150 generates an output signal that applies full brake to each of the feed reel 27, capstan 30, and take-up reel 37, as will be hereinafter described, Whenever the transport system is to be set in motion, these brakes must be released, and to do that the stop circuit 150 must be cleared.

At this point it should be mentioned that some of the inputs to some of the AND gates have a small "o". Wherever this "o" occurs it signifies a NOT. It is the equivalent to an inverter.

The output of the stop circuit 150 is connected by an output conductor 152, a conductor 153, a conductor 154, and a conductor 155 to the inverted input c of the AND gate 133. The only way the conductor 155 can receive a signal is from the stop circuit 150 through the conductors 152, 153, and 154. Because the stop circuit 150 has been cleared by the signal on the conductor 146, there is no signal on the conductor 155. With signals at inputs a and b and no signal on the inverted input c of the AND gate 133, the AND gate 133 is enabled with an output signal being fed through a conductor 157, an OR gate 158, and a conductor 159 to apply drag brake to the freed reel 30. The signal on the conductor 157 is fed through a conductor 160, a conductor 161, an OR gate 162, and a conductor 163 to apply clutch to the capstan 30. The signal on the conductor 160 is also fed through a conductor 164 to apply drag clutch to the take-up reel 37.

The signal on the output conductor 114 of the sequence initiator 113 is also fed through a conductor 167 to trigger a feed spool pulser 168. The feed spool pulser 168 is a circuit that when triggered generates a series of short pulses spaced approximately ⅓ of a second apart. These output pulses are fed through a conductor 169, an OR gate 170, and a conductor 171 to apply full clutch to the feed reel 27 for the length of time of each pulse, The result of the pulse input to the clutch of the feed reel 30 is to cause the feed reel to turn approximately 45° each time it receives a pulse.

At this point the magazine cartridge is in the feed reel 27, the film transport system is in low speed forward, the feed reel 27 has applied to it a drag brake and a pulsating full clutch causing the feed reel to turn in approximately 45° increments spaced about ⅓ of a second apart. The capstan clutch is being applied, and the drag clutch of the take-up reel is being applied. As the feed reel 27 rotates in 45° increments, the leader will come out of the film cartridge and engage the capstan 30. The capstan having picked up the film leader feeds it through the film gate 33 and finally into engagement with the take-up reel 37. As soon as the take-up reel 37 engages the leader it will act to pull the film through the film gate 33 in low speed causing the feed reel to rotate smoothly and not in 45° increments.

As previously stated, once the machine is loaded and the film is moving in low speed forward, it is to stop at the first document. This is accomplished by a signal from the center cells 39 which are comprised of two photocells each approximately the size of a timing mark 25 and located at or near the center of the document window 34 and aligned with the document marks 26. The photocells are spaced apart so that they can both be covered by a single document mark 26, but not by the timing marks 25. The centercells 39 are shown in block form at the top of FIG. 5. Whenever both cells are covered, that is, whenever a document mark becomes aligned with the cells, a signal will be fed through an output conductor 172 to the b input of the AND gate 143. As previously stated, the film is stopped only when it is traveling in low speed. This is true even in the high speed-search mode as will be explained. For this reason the AND gate 143 will not be enabled unless there is also a signal at its input a. Such a signal is present when the machine is in low speed as heretofore described. With signals on both inputs a and b, to the AND gate 143, a signal will be fed through a conductor 173, an OR gate 174, and the conductor 151 to the stop circuit 150. With the stop circuit enabled a signal will be fed through the conductors 152, 153, 154 and 155 to the inverted input c of the AND gate 133. This will disable the AND gate 133 removing the signal on the conductor 157, disengaging the drag brake to the feed reel 27, the clutch to the capstan 30, and drag clutch to the take-up reel 37. The signal on the conductor 152 is also fed through a conductor 175, a conductor 176, an OR gate 177, and a conductor 178 to apply full brake to the feed reel 27. The signal on the conductor 175 is also fed through a conductor 179, a conductor 180, an OR gate 181, and a conductor 182 to apply brake to the capstan 30. The signal on the conductor 179 is also fed through a conductor 183, an OR gate 184, and a conductor 185 to apply full brake to the take-up reel 37. Therefore, whenever the stop circuit 150 is enabled all previously applied signals are removed from the feed reel 27, the capstan 30 and take-up reel 37 and full brake applied to each. The machine has now recognized the first document in the roll and has stopped on that document.

CODE PROGRAMMING

With the machine stopped on the first document the operator enters the desired code onto the code selection section 71 of the control panel 70. This includes information entered in the button sections 73–76, column selectors 77–80, and the switch 89. The code information is fed from the code selection section 71 through a cable 190 to the exclusive comparator circuit 104. The exclusive comparator circuit 104 compares each code bit read from the film with the code bit information stored in the keyboard memory.

As previously explained, there is a 16 bit cell array 38 located just to the feed reel side of the document window 34. The cell array 38 includes a vertical series of 14 photocells aligned with the bits 53–66 on each code column. Two additional photocells are positioned side by side at the bottom of the vertical series in alignment with the timing marks 25. These two photocells are very similar to the photocells of the centercells 39 used to position the documents in the document window 34. Their purpose, however, is to recognize when the machine is in a series of documents (document field) or a series of code columns (code field). Such recognition capability is necessary especially during the auto-print mode. In this mode, the machine must print a series of documents, one after the other, and upon completing the series, go into high speed search. It can only do this by recognizing the end of the document field and the beginning of the next code field. Hence, there are a total of 16 photocells in the cell array 38.

SEARCH

Now that the code has been entered, the film can be searched for documents corresponding to the programmed code. To accomplish this, the search button 90 is pressed and released. This sends a strobe through a conductor 191 to a search command circuit 192. The search command circuit 192 is a flip-flop having outputs $a$ and $b$. When triggered by the signal on the conductor 191 a single pulse is generated at the output a which is fed through an output conductor 193, a conductor 194, the OR gate 145, and the conductor 146 to clear the stop circuit 150. This removes the brake signals on the feed reel 27, capstan 30, and take-up reel 37 as heretofore described. The pulse on the output conductor 193 is also fed through a conductor 195, a conductor 196, an OR gate 197, and a conductor 198 to the high speed input of the flip-flop 138, placing the flip-flop 138 in the high speed condition. With the flip-flop 138 in high speed condition, a signal is fed through a conductor 199 and a conductor 200 to the input b of an AND gate 201. The signal on the conductor 195 is also fed through a conductor 202, the OR gate 117, and the conductor 118 to the forward input of the flip-flop 120, placing the flip-flop 120 in its forward condition. With the flip-flop 120 in its forward condition, a signal is fed through the conductor 121 and a conductor 205 to the input a of the AND gate 201. The AND gate 201 also has an inverted input c which is connected by a conductor 207 and a conductor 208 to the conductor 153. The AND gate 201 is enabled only when there is no signal on the conductors 207 and 208 and this occurs only when the stop circuit 150 is cleared. With the stop circuit 150 cleared, as it is now, each of the inputs $a,b,$ and $c$ of the AND gate 201 is enabled causing a signal to be fed through a conductor 210, a conductor 211, the OR gate 158, and the conductor 159 to apply drag brake to the feed reel 27. The signal on the output conductor 210 will also be fed through a conductor 212 to the input a of an AND gate 213. The AND gate 213 has an input $b$ which is connected to the speed control multivibrator 105 to be hereinafter described. At the present it is enough to understand that as long as the speed of the film in the high speed condition is within prescribed limits, there will usually be a signal at the input $b$ of the AND gate 213. With signals at each of the inputs a and b of the AND gate 213, a signal will be fed through a conductor 214 to apply full clutch to the take-up reel 37. The system is now moving in high speed forward with drag brake applied to the feed reel 27 and full clutch to the take-up reel 37. There are no signals fed to the capstan clutch or brake, meaning that neither is engaged. The capstan 30 is free-wheeling.

When the search command flip-flop 192 is triggered, a signal of constant level is generated at its output b which is fed through a conductor 219 and a conductor 220 to the input a of an AND gate 222. The signal on the conductor 219 is also fed through a conductor 223 to the input a of an AND gate 225. The purposes for the AND gates 222 and 225 will be hereinafter described.

The machine is now running in high speed forward. As the film moves past the cell array 38, the cell array 38 reads each code column and sends signals corresponding to the code of each code column through a cable 230 and a cable 231, to the input b of the exclusive comparator circuit 104. The cell array 38 also sends signals from its two lower photocells that distinguish between timing marks 25 and document marks 26. In this way the machine knows whether it is in a code field or a document field, and the code column it is reading. The exclusive comparator circuit 104 compares these signals with those programmed from the code selection circuit 71.

Assume that there is correspondence between the programmed code and the code of one of the code columns in the film roll. When the cell array 38 reads this code column it will generate signals through the cables 230 and 231 to the input b of the exclusive comparator circuit 104. The exclusive comparator circuit will recognize this correspondence and will generate a "HIT" signal which is fed through a conductor 232 to the input $b$ of the AND gate 222. With signals on each of the inputs a and b of the AND gate 222, the AND gate 222 is enabled causing a signal to be fed through a conductor 239, a conductor 24, the OR gate 136, and the conductor 137 to the low speed input of the flip-flop 138, placing the flip-flop 138 and the machine in the low speed condition. The signal on the conductor 239 is also fed through a conductor 241 and a conductor 242 to the high voltage brake pulser 107.

With the film moving at approximately 125 inches per second, and the distance between the last of a series of code columns and the next document being only ⅜ to ** inch, the prior art devices were incapable of recognizing correspondence between a code column and the programmed code and then stop the machine with the next document centered in the document window 34 without first overrunning the document. Hence, the prior art devices either do not have random access capability, or they overrun the document, measure the overrun, and then back up to the document in low speed.

The system of this invention provides a means for stopping the machine on the next document without overrunning the document. It has been found that with application of rated voltage on the brake windings of the feed reel 27, capstan 30, and take-up reel 37, the reaction time of the brakes is too slow, causing the film to overrun the document. However, by this invention it is recognized that the reaction time of the brakes can be greatly increased by applying a relatively high voltage for a short period of time. For example, if the rate of voltage is 28 volts, the amplitude of the applied pulse might be approximately 48 volts. Because the high voltage pulse is applied for only a few miliseconds the brake windings are not damaged. Hence, the purpose of the high voltage pulse is to instantaneously kill the inertia in the system when a HIT signal is generated. This will allow the machine to quickly go into low speed and then stop on the next document without overrunning the document and without damage to the brake windings. This feature represents a vast improvement over the prior art.

The high voltage brake pulser 107 is a circuit that when triggered, generates at its output a single pulse approximately 100 miliseconds in width and with an amplitude considerably greater than the rated voltage of the brake winding, e.g. 48 volts, where the rated voltage is 28 volts.

With the high voltage brake pulser 107 triggered, the high voltage pulse is fed through a conductor 245, a conductor 246, the OR gate 184 and the conductor 185 to apply full brake to the take-up reel 37. The high voltage pulse on the conductor 245 is also fed through a conductor 247, a conductor 248, the OR gate 181, and the conductor 182 to apply the brake to the capstan 30. The high voltage pulse on the conductor 247 is also fed through a conductor 250, the OR gate 177, and the conductor 178 to apply full brake to the feed reel 27. Each of these brakes will be applied in full for the duration of the high voltage pulse. As may be recalled, the HIT signal from the exclusive comparator circuit 104 has simultaneously placed the flip-flop 138 in the low speed condition which, as heretofore described, applies drag brake to the feed reel 27, clutch to the capstan 30, and drag clutch to the take-up reel 37. However, the high voltage pulse will override these other signals and for the duration of the pulse will apply full brake to the feed reel 27, capstan 30, and take-up reel 37. At the end of the pulse the full brakes will be released and the system will go into its standard, low speed forward condition.

Now that correspondence has been recognized between a particular code column and the programmed code, a HIT signal has been generated, the high voltage pulser 107 has applied full brake to the system for a short period of time greatly slowing down the system, and the system is now in low speed forward, the system will stop at the next document just as it stopped at the first document when the cartridge was loaded. In this regard, it will be recalled that whenever the system is in low speed, the signal on the output conductor 139 of the flip-flop 138 is fed through the conductor 142 to the input a of the AND gate 143. The other input b, to the AND gate 143 will receive a signal whenever the center cell 39 recognizes a document in the document window 34. When this occurs, the output signal from the AND gate 143 is fed through the conductor 173, the OR gate 174 and the conductor 151 to enable the stop circuit 150. This will cause full brake to be applied to the feed reel 27, capstan 30, and take-up reel 37, stopping the system as heretofore described.

It should be emphasized that from the time the cell array 38 recognized the corresponding code column, to the time the machine stopped on the next document as just described, the film went from a speed of about 125–150 inches per second to a stop condition while traveling a distance of as little as ⅜ inch. As can be seen, all of this happens very quickly.

With the stop circuit 150 enabled, the output signal on the conductor 152, which is fed through the conductors 153 and 154, is also fed through a conductor 251 to the input b of an AND gate 252. The AND gate 252 also has an inverted input a that will be hereinafter explained. For now, it is sufficient to know that the input a is enabled whenever the auto-print mode is not used. With both inputs a and b enabled, a signal will be fed through a conductor 153, an OR gate 254, and a conductor 255 to the clear input of the search command flip-flop 192, clearing and resetting the flip-flop 192. Clearing the flip-flop 192, removes the signals on the outputs a and b that clear the stop circuit 150, place the system in high speed forward, and enable the AND gates 222 and 225. The purpose for the AND gate 222 is to prevent a HIT signal from placing the system in low speed unless it is also in the search mode. There are other modes (fast forward, fast reverse, space forward, space back, rewind, etc.) where the film is moving past the cell array and HIT signals are generated, but where the system should not stop. The AND gate 222 makes a HIT signal ineffective except during the search mode.

PRINT

Now that the film is stopped on a document, the document can be printed. This can be accomplished in two ways. One way is to simply press and release the print button 91. Pressing the print button 91 sends a strobe through a conductor 256, an OR gate 257, and a conductor 258 to the input of a printer control circuit 259. The printer control circuit 259 has three outputs a,b, and c. When the printer control circuit 259 is triggered by the input signal, signals appear at the outputs a and b. The signal at the output b is fed through a conductor 262 to a mirror flip solenoid 263. The mirror flip solenoid 263 flips a mirror to project the image of the document onto print paper. The signal at the output a is fed through a conductor 264 to the printer 265. The printer 265 includes all of the printing apparatus for making the print, such as the exposure time control, the print paper drive, and so on. It also includes means for feeding the finished print out of a suitable slot in the machine to the operator. After the print cycle is complete, the printer control circuit 259 generates a signal at its output c which is fed through a conductor 266, the OR gate 145, and the conductor 146 to clear the stop circuit 150, clearing the brakes on the feed reel 27, capstan 30, and take-up reel 37 and removing the clear signal from the search command circuit flip-flop 192.

Now that the print is complete, operation of the machine may be continued in any one of several modes.

AUTO-PRINT

An alternative to the manual print mode is the auto-print mode. Auto-print is used where it is desirable to search an entire roll of film printing all documents corresponding to the programmed code automatically. To operate the machine in this mode, the auto-print button 98 is pressed and released, usually after the film cartridge is loaded and the machine is stopped on the first document; however, this mode can also be initiated anytime the machine is in the search mode. Suppose the machine is stopped on the first document. The auto-print button 98 is pressed and then the search button 90, placing the machine in the search mode. When the auto-print button is pushed a strobe is fed through a conductor 280 to an auto-print flip-flop 281. The signal on the conductor 280 triggers the auto-print flip-flop 281, producing an output signal which is fed through a conductor 284 and a conductor 285 to the input c of the AND gate 225. Whenever the system is stopped, the output signal from the stop circuit 150 is fed through the conductors 152, 153, and 208, through a conductor 286, a conductor 287, a conductor 288, and a conductor 289 to enable the input b of the AND gate 225. As heretofore described, whenever the search command flip-flop 192 is enabled, the output signal on the output b of the flip-flop 192 is fed through the conductors 219 and 223 to the input a of the AND gate 225. Therefore, each of the inputs a,b, and c of the AND gate 225 are enabled only when the system is in auto-print, when it is stopped, and when the search command circuit flip-flop 192 is enabled. If it were not for this last requirement, the machine would go into auto-print when, after it is loaded, it stops on the first document.

In the other operating modes, as soon as the machine stops after being in search, the search flip-flop 192 is automatically cleared by the signal on the conductor 255 from the stop circuit 150. If this were true in the auto-print mode, when the machine stops there would be no signal on the conductor 223 to the input a of the AND gate 225 and the AND gate 225 would not be enabled. Therefore, there is a conductor 290 that carries a signal from the conductor 284, at the output of the auto-print flip-flop 281, which is fed through a conductor 291 to the inverted input a of the AND gate 252. Because of the inverted input a, whenever the system is in auto-print the AND gate 252 will be disabled and there will be no signal on the output conductor 253 to clear the search command circuit flip-flop 192. Therefore, in auto-print the flip-flop 192 will not be cleared after the machine is stopped. Hence, with signals on each of the inputs a,b, and c of the AND gate 225, the AND gate 225 is enabled and a signal is fed through a conductor 294, the OR gate 257, and the conductor 258 to trigger the printer control circuit 259. This will activate the print cycle as heretofore described.

At the completion of the print cycle a print complete signal at the output c of the printer control circuit 259 will be fed through the conductor 266, the OR gate 145 and the conductor 146 to clear the stop circuit 150. Because the system was in low speed forward just before the film was stopped, as soon as the stop circuit 150 is cleared, disengaging the brakes, the system will again move in low speed forward stopping on the next document in the series. Since the system is still in auto-print, this document will be printed as heretofore described after which it will again go into low speed forward stopping at the next document.

This sequence will continue until the last document in a given series is printed. When this happens, the cell array 38 will no longer be in a document field but will be in a code field. The system will go into low speed forward again, but as soon as the cell array 38 recognizes a timing mark 25, which will be after the film has traveled only a fraction of an inch, the cell array will send signals through the cable 230 and a cable 295 to trigger a timing mark recognition circuit 296. The timing mark recognition circuit 296 will then generate a signal at its output which is fed through a conductor 297 to the input a of an AND gate 298. The AND gate 298 has an input c connected by a conductor 299 to the conductor 290 which carries the output signal from the auto-print flip-flop 281. The input c of the AND gate 298 is enabled whenever the auto-print mode is activated. A third input b of the AND gate 298 is connected by a conductor 300 to the output of a stop delay flip-flop 301. The stop delay flip-flop 301 has a clock pulse input and a clear input. When a signal appears at the clock pulse input, there is no output signal from the stop delay flip-flop 301. When a signal appears at the clear input, there is a signal on the output. The clear input of the stop delay flip-flop 301 is connected by a conductor 302 to the conductor 288 which carries the output signal from the stop circuit 150. The clock pulse input is connected by a conductor 303 to the conductor 241 which carries the HIT signal from the output of the AND gate 222. Therefore, as soon as the system stops on a document, a stop signal will be fed through the conductors 288 and 302 to clear the stop delay flip-flop 301, generating an output signal at the output of the flip-flop 301 which is carried through the conductor 300 to the input b of the AND gate 298. In the meantime the input c of the AND gate 298 is enabled by virtue of being in the auto-print mode. When the print is completed, the system proceeds in low speed forward until the cell array 38 recognizes a timing mark. This enables the input a of the AND gate 298. With each of the inputs a,b, and c to the AND gate 298 enabled, a signal is fed through a conductor 304, the OR gate 197, and the conductor 198 to the high speed input of the flip-flop 138, placing the flip-flop 138 in the high speed condition. The system immediately goes into the search mode.

Therefore, one of the purposes of the stop delay flip-flop 301 is to enable the AND gate 298 so that the system will resume high speed search as soon as the cell array 38 recognizes a timing mark 25. However, the flip-flop 301 has another purpose. Suppose a HIT signal is generated from one of a series of code columns so that the timing marks 25 of another code column passes the cell array 38 before the next document. The timing mark recognition circuit 296 will generate a signal at the conductor 297 every time one of these timing marks passes, even though a HIT has already been generated. The signal on the conductor 297 tends to put the system in high speed forward, but as previously stated, when a HIT is generated, the system is to go into low speed forward and then stop. The stop delay flip-flop 301 prevents the system from going into high speed after a HIT signal is generated, but before the system stops on the next document. As previously explained, when the exclusive comparator circuit 104 generates a HIT signal, it is fed through the conductor 232, the AND gate 222, and the conductors 239 and 241 to the high voltage brake pulser 107. The HIT signal on the conductor 241 is also fed through the conductor 303 to the clock pulse input of the stop delay flip-flop 301. This will place a zero signal condition at the output of the flip-flop 301 which will disable the input b to the AND gate 298, preventing the system from going into high speed.

With the system again in high speed search, it will continue to search the code columns on the film strip for more HITs. If another HIT signal is generated, the system will automatically stop and print that series of documents after which it will again go back into high speed search, and so on until the last code column on the film is read. This, in effect, completes the auto-print mode sequence.

Regardless of whether the auto-print mode or one of the manual modes is used, the machine can be operated to search completely through the roll of film.

END OF FILM

There is spaced from the last document on the film and end-of-film code column 304. This code column is chosen to read 15–15–15, (all bits 55–66 used) so as to not to be confused with a programmed code. In addition to using bits 55–66 the utility bit 54 is also used. Just before hitting the end-of-film column, the machine could be in either high speed search or low speed. It would be in low speed, for example, if the machine had stopped on the last document or had been in auto-print or single image forward. In either case, when the cell array 38 reads the end-of-film column 304, a signal is fed through the conductor 230 and a conductor 311 which triggers an end-of-film circuit 312. A signal is generated at the output of the end-of-film circuit 312 which is fed through a conductor 313, a conductor 314, a conductor 315 an OR gate 316, and a conductor 317 to the reverse input of the flip-flop 120, placing the flip-flop 120 in the reverse condition. With the flip-flop 120 in the reverse condition, a signal is fed through an output conductor 320, and a conductor 321, to the input a of an AND gate 322. The end-of-film signal on the conductor 314 is also fed through a conductor 323, the OR gate 197, and the conductor 198. to the high speed input of the flip-flop 138, placing the flip-flop 138 in the high speed condition. A signal is then fed through the conductor 199 and a conductor 324, to the input b of the AND gate 322. The AND gate 322 also has an inverted input c which is connected to the conductor 287 by a conductor 325. Just as with the AND gates 133 and 201, the inverted input c of the AND gate 322 will be enabled whenever the stop circuit 150 is cleared, which is whenever the system is in motion. With each of the input a,b, and c of the AND gate 322 enabled, a signal is fed through a conductor 326, a conductor 327, the OR gate 170 and the conductor 171 to apply full clutch to the feed reel 27. The signal on the conductor 326 is also fed through a conductor 328, an OR gate 329, and a conductor 330 to apply drag brake to the take-up reel 37. The system is now in high speed reverse, as shown in the chart of FIG. 6.

The signal on the conductor 323 is also fed through a conductor 331, the OR gate 254, and the conductor 255 to clear the search command flip-flop 192.

With full clutch applied to the feed reel 27, no clutch or brake applied to the capstan 30, and drag brake applied to the take-up reel 37, the end-of-film signal on the conductor 313 is also fed through a conductor 335, an OR gate 336, and a conductor 337 to the clear input of the auto-print flip-flop 281, clearing the auto-print flip-flop 281, and taking the system out of the auto-print mode. Also, with the search command flip-flop cleared the AND gate 222 is disabled so that HIT signals from the exclusive comparator circuit 104 will not cause the system to stop. Hence, in this condition, the machine will continue in high speed reverse until it recognizes the beginning of the film.

BEGINNING OF FILM

Assuming the operator has not pressed the unload switch 99, the machine will rewind until it recognizes the beginning-of-film code column 338. This column is spaced prior to the first code field on the film and is exactly the same as the end-of-film code column 304, except the utility bit 54 is not used. When the cell array 38 reads the beginning-of-film code column 338, a signal is fed through the conductor 230 and a conductor 340 to a beginning-of-film circuit 341. A signal is generated at the output of the beginning-of-film circuit 341 which is fed through a conductor 342 to the input a of an AND gate 343. The AND gate 343 has an inverted input b which is connected by a conductor 344 to the output of an unload circuit which will be hereinafter described. At this point it is sufficient to know that as long as the unload switch 99 has not been pressed, there is no signal on the conductor 344 and both inputs a and b of the AND gate 343 are enabled. A signal is, therefore, fed through a conductor 345, a conductor 346, the OR gate 117 and the conductor 118 to the forward input of the flip-flop 120, placing the flip-flop 120 in the forward condition. The signal on the conductor 345 is also fed through a conductor 347, the OR gate 136, and the conductor 137 to the low speed input of the flip-flop 138, placing the flip-flop 138 in the low speed condition. The machine will immediately go into low speed forward and stop on the first document as heretofore described. The film can again be searched if desired.

UNLOAD

Rather than searching the film again, the operator may wish to rewind all of the film and unload the film cartridge. This is accomplished by pressing and releasing the unload switch 99. When the unload switch 99 is pressed, a strobe is fed through a conductor 350 to a set input of an unload circuit 351. By setting the unload circuit 351, a signal is fed through a conductor 352, and the conductor 344 to the inverted input b of the AND gate 343. This will disable the AND gate 343, preventing the machine from going into low speed forward when it recognizes the beginning of film code column 338. The machine will continue to rewind past the beginning of film code column 338 until all of the film is back in the cartridge.

After all of the film is in the cartridge, the cartridge is automatically ejected. To be certain that all of the film is rewound onto the cartridge, the capstan 30, which is free-wheeling at high speed and which is driven solely by the movement of the film, is used as an indication of not only the speed of the film but the presence or absence of it. Therefore, in rewind, when the beginning of the film has gone past the capstan 30, the capstan 30 will immediately slow down and stop.

Mounted to the pinch roller 31 of the capstan 30 is a small disc 355 having a series of holes 356 equally spaced around its periphery (FIGS. 7 and 8). Mounted in alignment with these holes is a light source 357 on one side of the disc 355, and a photocell 358 on the other. As the capstan 30, and hence the disc 355, rotates, the photocell 358 generates pulses which are fed through a conductor 370 to the trigger input of the capstan motion monostable multivibrator 105. The monostable multivibrator 105 has outputs Q and Q. Each time the multivibrator 105 is triggered by the pulses from the photocell 358, a positive pulse of fixed width is generated at the Q output and a negative pulse of the same width is generated at the Q output. The Q output pulses are fed through a conductor 373 to the film motion integrator 106, to charge a capacitor which is part of the integrator circuitry. As long as the film motion integrator 106 receives these pulses there is no signal at its output. The output of the film motion integrator 106 is connected by a conductor 375 to the input a of an AND gate 376. Therefore, as long as the capstan 30 is rotating, the AND gate 376 is inhibited and there will be no signal at its output. The AND gate 376 has an input b connected by a conductor 377 to the output conductor 352 of the unload circuit 351. When the beginning of the film moves past the capstan 30, the capstan 30 will stop and the pulse output from the capstan motion monostable multivibrator 105 will stop producing constant width pulses causing the film motion integrator 106 to go to zero volts and generate a signal at its output which is fed through the conductor 375 enabling the input a of the AND gate 376. With each of the inputs a and b of the AND gate 376 enabled a signal is fed through a conductor 378 to actuate a magazine unlock solenoid 379. This will cause the film cartridge to eject from the feed reel, which will also release the magazine insert switch 110. With the magazine insert switch 110 released, a signal is fed through a conductor 380 and a conductor 381 to the clear input of the unload circuit 351, clearing the unload circuit 351, i.e. re-enabling the magazine lock mechanism so that a new cartridge can be inserted. The signal on the conductor 380 is also fed through a conductor 382, the OR gate 174, and the conductor 151 to the stop circuit 150, stopping the machine as heretofore described.

FILM SPEED CONTROL

In the search mode if the speed of the film is allowed to exceed the prescribed upper limit (about 125–150 inches per second) by very much, as when the diameter of the film roll on the take-up reel 37 becomes large, even the high voltage brake pulser will be unable to reduce the inertia in the system sufficiently to stop the film without overrunning the next document. Therefore, the system of this invention includes a means for controlling the film speed.

Because the capstan is free-wheeling in either high speed forward or high speed reverse, it is a direct indication of film speed. Therefore, the same disc 355, light source 357, photocell 358, and capstan motion monostable multivibrator 105 is used to control the film speed as was used to indicate when the film was completely rewound on the film cartridge. It should be recalled that the capstan motion monostable multivibrator 105 generates a negative pulse of fixed width at its Q output each time a hole 356 in the capstan disc 355 moves past the photocell 358. The rate of these pulses will, therefore, increase as the capstan speed increases. Hence, the rate of these pulses is a direct measure of the film speed. The negative Q output pulses are fed through a conductor 390 to the input b of the AND gate 213. It should be recalled that it is the signal on the other input a of the AND gate 213 that enables this AND gate to send a signal through the conductor 214 to apply full clutch to the take-up reel during high speed forward. Each time a negative pulse appears at the input b of the AND gate 213, the AND gate 213 is disabled for the duration of the pulse. If these pulses are not too frequent, the AND gate will maintain sufficient voltage on the take-up clutch winding to hold the take-up reel 37 in the full clutch condition. But, when these pulses become too frequent, as when the film speed increases over the prescribed rate, the clutch coil voltage will drop off and the take-up clutch will begin to operate as a drag clutch or even disengage. With the take-up clutch disengaged or dragging, the take-up reel will begin to slow down since there is drag brake on the feed spool, causing the film to slow down. As the film slows to the prescribed speed, the pulse rate decreases and the engagement of the take-up clutch increases. The engagement and disengagement of the take-up reel clutch will continue to accurately control the speed of the film. Because the speed control circuit affects only the full clutch signal to the take-up reel 37, the speed control system only operates in the fast forward direction which includes the search mode, the only mode from which it is necessary to stop on a document. For this described embodiment the film speed is not critical in the high speed reverse mode and is not controlled.

SPACE FORWARD – SPACE BACKWARD

In addition to the print mode and the automatic modes there are certain other manual modes that can be used. There are times when it is desirable to move the film only a small increment, less than the distance between the documents in a series. This can be accomplished by pressing and releasing either the space forward switch 94, or space back switch 95. When the space forward switch 94 is pressed, a strobe is fed through a conductor 400, a conductor 401, the OR gate 117, and the conductor 118 to the forward input of the flip-flop 120 placing the flip-flop 120 in the forward condition. The signal on the conductor 400 is also fed through a conductor 402, an OR gate 403, and a conductor 404 to a space circuit 405. The space circuit 405 has two outputs a and b. When the circuit 405 is triggered by the pulse on the conductor 404, a pulse is generated at the output a but not the output b. After a fraction of a second has passed, a pulse is generated at the output b but not the output a. Therefore, when the circuit 405 is triggered, a pulse is fed through a conductor 406, a conductor 407, the OR gate 136, and the conductor 137 to the low speed input of the flip-flop 138, placing the flip-flop 138 in the low speed condition. The system is now in low speed forward. The pulse on the conductor 406 is also fed through a conductor 408, the OR gate 145, and the conductor 146 to clear the stop circuit 150. The system will then move in low speed forward until the pulse is generated at the output b of the space circuit 405 which is timed so that the film moves only a fraction of an inch. When the pulse is generated at the output b of the space circuit 405, it is fed through a conductor 409, the OR gate 174, and the conductor 151 to the stop circuit 150, stopping the system. Each time the space forward button is pushed, the system will move a small increment.

When the space back button 95 is pushed, a strobe is fed through a conductor 410, a conductor 411, the OR gate 403, and the conductor 404 to the space circuit 405. The space circuit 405 functions in the same manner as with the space forward button 94. The strobe on the conductor 410 is also fed through a conductor 412, the OR gate 316, and the conductor 317 to the reverse input of the flip-flop 120, placing the flip-flop 120 in the reverse condition. With the flip-flop 120 in the reverse condition a signal is passed through the conductor 320 and a conductor 415 to the input a of an AND gate 416. The b input of the AND gate 416 is connected by a conductor 417 and the conductors 140 and 139 to the low speed output of the flip-flop 138. The AND gate 416 has an inverted input c connected by a conductor 418 and the conductors 286,208,153 and 152 to the output of the stop circuit 150. Just as with the AND gates 133, 201 and 322, the AND gate 416 will be enabled only when the stop circuit 150 is cleared as is the case whenever the film is in motion. With the stop circuit 150 cleared and the machine in low speed reverse, each of the inputs a,b, and c to the AND gate 416 is enabled. With the AND gate 416 enabled a signal is fed through a conductor 420 and a conductor 421 to apply drag clutch to the feed reel 27. The signal on the conductor 420 is also fed through a conductor 422, the OR gate 162, and the conductor 163 to apply clutch to the capstan 30. The signal on the conductor 420 is also fed through a conductor 423, the OR gate 329, and the conductor 330 to apply drag brake to the take-up reel 37. Therefore, each time the space back button 95 is pressed, the system will move in the low speed reverse direction a small increment.

HIGH SPEED FORWARD – HIGH SPEED REVERSE

The operator may wish to move the film in high speed forward or high speed reverse only a given distance. This can be accomplished by use of the fast forward button 96 or fast reverse button 97. When one of these buttons is pressed and held, the machine will travel in either high speed forward or high speed reverse. With the switch released, the machine will go into low speed and stop. When the fast forward button 96 is pressed, a single strobe is fed through a conductor 430, the conductor 434, the OR gate 117 and the conductor 118 to the forward input of the flip-flop 120, placing the flip-flop 120 in the forward condition. The signal on the conductor 430 is also fed through a conductor 435, a conductor 436, the OR gate 197, and the conductor 198 to the high speed input of the flip-flop 138, placing the flip-flop 138 in the high speed condition. The signal on the conductor 435 is also fed through a conductor 437, the OR gate 438, a conductor 439, the OR gate 145, and the conductor 146 to clear the stop circuit 150. The system is now in high speed forward and will continue in high speed forward until either the end-of-film code column 304 is recognized, or the fast forward button 96 is released. If the end-of-film code column 304 is recognized, the machine automatically goes into the rewind mode as heretofore described. If the fast forward button 96 is released a single strobe is fed through a conductor 440, an OR gate 441, a conductor 442, the OR gate 136, and the conductor 137 to the low speed input of the flip-flop 138, placing the flip-flop 138 in the low speed condition. This will cause the machine to stop at the next document as heretofore described.

When the fast reverse button 97 is pressed, a strobe is fed through a conductor 445, a conductor 449, the OR gate 316, and the conductor 317 to the reverse input of the flip-flop 120, placing the flip-flop 120 in the reverse condition. The signal on the conductor 445 is also fed through a conductor 450, a conductor 451, the OR gate 197, and the conductor 198 to the high speed input of the flip-flop 138, placing the flip-flop 138 in the high speed condition. The signal on the conductor 450 is also fed through a conductor 452, the OR gate 438, the conductor 439, the OR gate 145, and the conductor 146 to clear the stop circuit 150. The system is now in high speed reverse and will continue in high speed reverse until either the beginning-of-film code column 338 is recognized or the fast reverse button is released. If the beginning-of-film code columns 338 is recognized and the unload mode is not activated, the system will go into low speed forward, stopping on the first document as heretofore described. If the fast reverse button 97 is released, a single strobe is fed through a conductor 460, the OR gate 441, the conductor 442, the OR gate 136, and the conductor 137 to the low speed input of the flip-flop 138, placing the flip-flop 138 in the low speed condition. This will cause the machine to go into low speed and stop at the next document as heretofore described.

When using the fast forward or fast reverse modes it is possible that the machine will not stop directly on a document. Because the purpose of these modes is not to recognize code columns, the high voltage brake system is not used as in the search mode. Therefore, when the fast forward or fast reverse button is released the machine may be so close to a document that the ordinary braking system will not be able to stop the machine directly on the next document. It may run past the document. This is of no consequence, however, since the operator, in using these modes is not looking to accurately position documents. He is only moving the film along in one direction or another. A document could be centered in the document window, however, by using the appropriate space switch 94 or 95 or "1" switch 92 or 93.

REWIND

The operator can rewind the film at any time by pressing and releasing the rewind button 100. When the rewind button 100 is pressed, a strobe is fed through a conductor 465, a conductor 466, a conductor 467, the OR gate 316, and the conductor 317 to the reverse input of the flip-flop 120, placing the flip-flop 120 in the reverse condition. The strobe on the conductor 466 is also fed through a conductor 468, a conductor 469, the OR gate 197 and the conductor 198 to the high speed input of the flip-flop 138, placing the flip-flop 138 in the high speed condition. The signal on the conductor 468 is also fed through a conductor 470, the OR gate 145, and the conductor 146, to clear the stop circuit 150. The system is now in high speed reverse. The signal on the conductor 465 from the rewind switch 100 is also fed through a conductor 471, the OR gate 336, and the conductor 337 to clear the auto-print flip-flop 281. This is simply to insure that the machine will be cleared for the next search. When the rewind button is pressed, the machine operates in exactly the same manner as when the end-of-film is recognized and it automatically goes into rewind. If the unload switch has been pressed, the machine will unload. If it has not been pressed, the machine will recognize the beginning-of-film, go into low speed forward, and stop at the first document.

"1" FORWARD – "1" REVERSE

Another useful mode, especially where the auto-print mode is not used, is the "1" forward or "1" reverse mode. These modes allow the operator to move from document to document in either direction. If either of the buttons 92 or 93 is held depressed, the machine will go from one document to another in low speed holding about one second on a document and then automatically moving to the next. When the "1" forward switch 92 is depressed a strobe is fed through a conductor 475, a conductor 476, an OR gate 477, and a conductor 478 to trigger a "1" start circuit 479. When triggered, the "1" start circuit 479 generates a series of pulses the time spacing of which is adjustable, but which has been found to work very well with a pulse rate of about one every two seconds. These pulses are fed through a conductor 480, a conductor 481, the OR gate 136, and the conductor 137 to the low speed input of the flip-flop 138, placing the flip-flop 138 in the low speed condition. The signal on the conductor 480 is also fed through a conductor 482, the OR gate 145, and the conductor 146 to clear the stop circuit 150. The signal on the conductor 475 is also fed through a conductor 483, the OR gate 117, and the conductor 118 to the forward input of the flip-flop 120, placing the flip-flop 120 in the forward condition. The system is now in low speed forward. It will then stop at the next document as heretofor described. It takes approximately 0.5 seconds to go between documents. Therefore, the machine will stop on the next document for about 1 ½ seconds until the next pulse is generated by the "1" start circuit 479. This pulse will again clear the stop circuit 150, putting the machine back in low speed forward where it will stop on the next document, and so on, until either the end-of-film code column 304 is recognized or the "1" forward button 92 is released. If the end-of-film code column 304 is recognized, the machine automatically goes into the rewind mode as heretofore described. If the "1" forward button 92 is released, a single strobe is fed through a conductor 484, the OR gate 485, and a conductor 486 to clear the "1" start circuit 479, disabling the "1" forward mode.

The "1" reverse mode operates in much the same manner as the one forward mode except, of course, in the reverse direction. When the "1" reverse button 93 is depressed, a single strobe is fed through a conductor 487, a conductor 488, the OR gate 477, and the conductor 478 to trigger the "1" start circuit 479. The "1" start circuit 479 operates in exactly the same manner as the "1" forward mode. The signal on the conductor 487 is also fed through a conductor 489, the OR gate 316, and the conductor 317 to the reverse input of the flip-flop 120, placing the flip-flop 120 in the reverse condition. The system is now in low speed reverse whereupon it will stop at the next document.

The operation will continue just as in the "1" forward mode except in the reverse direction until either the beginning-of-film code column 338 is recognized, or the "1" reverse button 93 is released. If the beginning-of-film code column 338 is recognized, the machine will automatically go into low speed forward and stop on the first document as heretofore described. If the "1" reverse button 93 is released, a single strobe is fed through a conductor 490, the OR gate 485, and the conductor 486 to clear the "1" start circuit 479, disabling the "1" reverse mode.

STOP

There is also a stop mode. This mode is used whenever the operator wishes to stop film motion in the machine. To accomplish this he presses and releases the stop switch 101. When the stop switch 101 is pressed, a strobe is fed through a conductor 491, a conductor 492, the OR gate 174, and the conductor 151 to trigger the stop circuit 150. This will apply full brake to the feed reel 27, the capstan 30, and take-up reel 37 as heretofore described. The signal on the conductor 491 is also fed through a conductor 493, a conductor 494, the OR gate 136, and the conductor 137, to the low speed input of the flip-flop 138, placing the flip-flop 138 in the low speed condition. The signal on the conductor 493 is also fed through a conductor 495, a conductor 496, the OR gate 117, and the conductor 118 to the forward input of the flip-flop 120, placing the flip-flop 120 in the forward condition. Therefore, whenever the stop switch is pressed, the flip-flop 138 is placed in the low speed condition and the flip-flop 120 is placed in the forward condition. This is done primarily to obviate the need of having to reverse the drive motor 43 as a prelude to a search operation, the operation most frequently used. The signal on the conductor 495 is also fed through a conductor 497, the OR gate 336, and the conductor 337 to clear the auto-print flip-flop 281. This is a precautionary measure to insure that the printer will not automatically operate in the stop mode should it be in auto-print.

HIGH VOLTAGE BRAKE PULSER

Figure 9:
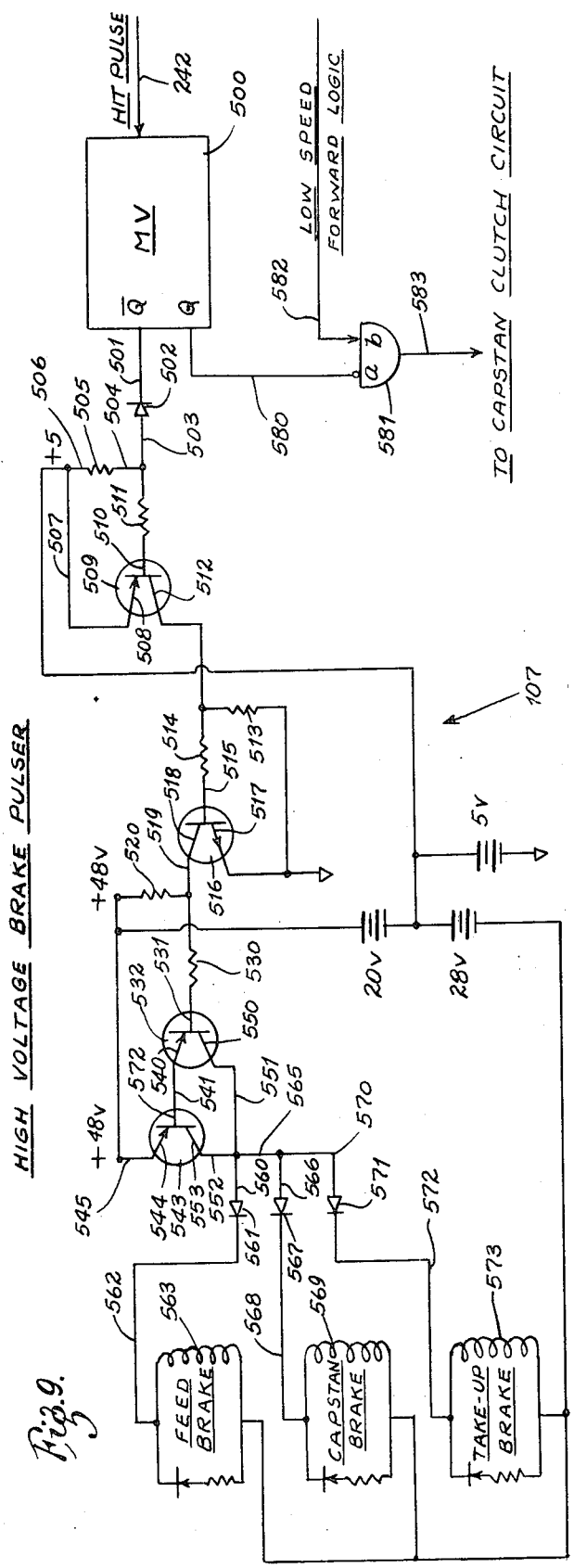
FIG. 9 is a schematic diagram of the high voltage brake pulser of this invention.

A detailed description of the high voltage brake pulser 107 follows. Referring to FIG. 9 there is shown a one-shot or monostable multivibrator 500 having input and outputs Q and $\bar{Q}$. The monostable multivibrator 500 is such that for each input signal pulse it will produce a single positive pulse at its Q output and a single negative pulse at its $\bar{Q}$ output of a preselective duration. For example, in this case the input pulse or HIT signal is about 30 miliseconds, and the multivibrator 500 has been set to produce an output pulse of about 5 miliseconds duration. However, this pulse width is only representative, the selected width depending on the high voltage pulse to be applied and the type of brake used. When a HIT signal is generated by the exclusive comparator circuit 104, it is fed through the conductor 242 to trigger the monostable multivibrator 500. The 5 milisecond negative output pulse generated at the $\overline{Q}$ output of the multivibrator 500 is fed through a conductor 501 to a diode 502. The other side of the diode 502 is connected by a conductor 503, a conductor 504, a resistor 505, and a conductor 506 to a 5 volt DC supply. The 5 volt supply is also connected by a conductor 507 to the emitter 508 of a transistor 509. The transistor 509 has a base 510 connected through a resistor 511 to the conductor 504. The transistor 509 has a collector 512 connected through a resistor 513 to ground. The collector 512 is also connected through a resistor 514 to the base 515 of a transistor 516. The transistor 516 has an emitter 517 connected to ground, and a collector 518 connected by a conductor 519 and a resistor 520 to a 48 volt DC potential. The conductor 519 is also connected through a resistor 530 to the base 531 of a transistor 532. The transistor 543 has an emitter 544 connected by a conductor 545 to the plus 48 volt DC potential. The transistor 532 has a collector 550 connected by a conductor 551 and a conductor 552 to the collector 553 of the transistor 543. The transistors 532 and 543 make up a Darlington pair. The conductors 551 and 552 are connected by a conductor 560, a diode 561, and a conductor 562 to the feed brake coil, 563. The conductors 551 and 552 are also connected by a conductor 565, a conductor 566, a diode 567, and a conductor 568 to the capstan brake coil 569. The conductor 565 is also connected by a conductor 570, a diode 571, and a conductor 572 to the take-up brake coil 573.

The $\overline{Q}$ output pulse on the conductor 501 forward biases the transistor 509 causing it to conduct. This in turn forward biases the transistor 516 causing the transistor 516 to conduct. This will turn on the Darlington pair transistors 532 and 543 causing saturation of the transistor 543 and resulting in a delivery of the full 48 volts at approximately 2 amps to the feed brake coil 563, capstan brake coil 569, and take-up brake coil 573. This 48 volt signal will be applied to these coils for the duration of the $\overline{Q}$ output pulse, at the end of which the transistors will stop conducting and the high voltage signal will be removed. The $\overline{Q}$ pulse is of sufficient duration, however, to greatly reduce the inertia in the system, allowing the system to go into low speed forward. The transistor 516 is essentially an isolating transistor to prevent the 48 volt potential from being applied to the logic circuitry which operates on only 5 volts.

The Q output pulse is fed through a conductor 580 to the inverted input a of an AND gate 581. The other input b to the AND gate 581 is connected by a conductor 582, to the low speed forward logic heretofore described. The output of the AND gate 581 is connected by a conductor 583 to the capstan clutch circuit (not shown). The capstan clutch circuit is simply the circuit that upon receiving the correct logic signal, applies the capstan clutch. It will be recalled that when a HIT signal is obtained, the machine goes into low speed forward, and when in low speed forward the capstan clutch is applied. However, during application of the high voltage pulse to each of the brakes it is desirable to inhibit application of the capstan clutch to give maximum braking. The Q signal on the conductor 580 inhibits the AND gate 581 which in turn inhibits application of the capstan clutch until after the high voltage pulse has been applied. At the end of this time the Q signal drops to zero, allowing application of the capstan clutch for low speed forward operation.

FILM MOTION INTEGRATOR

Figure 10:
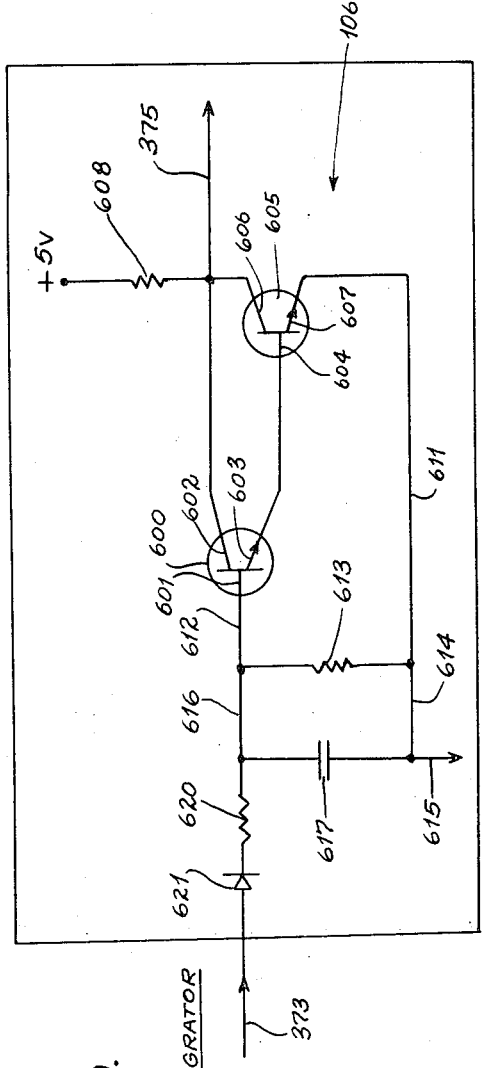
FIG. 10 is a schematic diagram of the film motion integrator of this invention.

The film motion integrator 106 inhibits the AND gate 376 until all of the film is rewound on the film cartridge, after which the AND gate 376 is enabled, actuating the magazine unlock solenoid 379 and ejecting the film cartridge. In FIG. 10 there is shown the film motion integrator 106 having a transistor 600. The transistor 600 has a base 601, a collector 602, and an emitter 603. The emitter 603 is connected to the base 604 of the transistor 605. The transistor 605 also has a collector 606 and an emitter 607. The collector 602 of the transistor 600 is connected to the collector 606 of the transistor 605. The collectors 602, and 606 are connected through a resistor 608 to a 5 volt BC supply. The collectors 602 and 606 are also connected to an output conductor 375. The emitter 607 of the transistor 605 is connected by a conductor 611 to ground. The base 601 of the transistor 600 is connected by a conductor 612 to one side of a resistor 613. The other side of the resistor 613 is connected by a conductor 614 and a conductor 615 to round. The conductor 612 is also connected by a conductor 616 to one side of a capacitor 617. The other side of the capacitor 617 is connected by the conductor 615 to ground. The conductor 616 is also connected by a resistor 620 and a diode 621 to the input conductor 373 from the Q output of the film motion monostable multivibrator 105.

The Q output pulses from the film motion monostable multivibrator 105, generated as long as the capstan 32 is rotating, are fed through the conductor 373, the diode 621, and the resistor 620 to charge the capacitor 617. The capacitor 617 discharges through the transistors 600 and 605 causing the transistor 605 to conduct. This results in a zero output at the output conductor 375. With no signal on the conductor 375, the AND gate 376 is inhibited, preventing ejecting of the film magazine. When the capstan stops rotating, which is when the film is rewound in the film cartridge, there will be no Q output pulses and the charge on the capacitor 617 will bleed off to zero. This will cause the transistor 605 to stop conducting, driving the signal on the output conductor 375 to 5 volts, or a "1" level. This will enable the AND gate 376 causing the film magazine to eject.

Although this invention is described as used with film having a single row of code columns and documents, the same inventive features could be used with double row film. It is not known whether this type of film is available, but it is a simple matter of doubling the width of the film to accommodate a second row having code columns and documents like those of the first row only reading from left to right rather than right to left. In this modification each row would have its own document window and cell array. The logic would cause the machine to scan the first row of film as heretofore described, using the first cell array and then instead of going into rewind, would scan the second row in the reverse direction using the second cell array. This would effectively double the length of film that can be scanned. The second cell array, of course, would be aligned with the code columns in the second row and mounted on the opposite side of the document window as the first cell array. Also, since it would be necessary to stop the machine in the reverse direction whenever a hit is obtained, the speed control circuit and the high voltage brake pulser circuit would be used in the reverse direction just as it is used in the embodiment just described. Means would also be provided for automatically projecting the document images of the appropriate row depending on the direction of scan; hence, if the machine is scanning the first row and a HIT is obtained, only the first row document would be projected. If the machine is canning the second row in the reverse direction and a HIT is obtained, only the second row document would be projected. There are several ways to achieve this, one of which being to automatically change the angle of the projection mirror, using solenoid operation, from one row to the other as the direction of scan changes.

Various changes and modifications may be made within the invention as will be readily apparent to those skilled in the art. Such changes and modifications are within the scope and teaching of this invention as defined by the claims appended hereto.

What is claimed is:

1. A film reader for use with film having a plurality of document images thereon and code means before each document image or series of document images, the code means comprising one or more code variations each of which relates to the document images immediately following, the reader comprising means for driving the film at a relatively high speed in a given direction, means for programming a selected code variation; means for reading each code variation on the film, exclusive comparator means responsive to the programming means and the reading means for recognizing correspondence between the programmed code variation and the code variations on the film, means responsive to the comparator means when correspondence is recognized for instantaneously applying an extreme braking force to the film drive means instantaneously reducing the film speed to a relatively low speed in the same direction, and means for stopping the film on the next document without overrunning the document.

2. The film reader of claim 1 including means for controlling the relatively high film speed to within predetermined limits.

3. The film reader of claim 2 wherein the speed control means includes means for sensing the speed of the film, and means responsive to the sensing means for disengaging the film drive means until the film speed is slowed to a predetermined rate.

4. The film reader of claim 3 wherein the sensing means and the means responsive to said sensing means include a disc associated with the drive means, means for rotating the disc at a speed directly related to the speed of the film, the disc having equally spaced holes around its periphery, a light source aligned to transmit light successively through each of the holes as the disc rotates, a photosensitive means aligned with the light source on the other side of the holes to receive the light successively transmitted therethrough as the disc rotates, the photosensitive means generating an electrical signal each time a hole passes between the light source and the photosensitive means, means for generating a pulse of fixed width in response to each signal from said photosensitive means whereby the rate of these pulses is directly related to the speed of the film, and means responsive to the rate of these pulses for disengaging said film drive means when the pulse rate exceeds a predetermined value.

5. The film reader of claim 4 wherein the film drive means includes a motor, a film take-up means, the take-up means having associated therewith a clutch for engagement and disengagement of the take-up means with the motor, and means responsive to the pulse rate, for disengaging the clutch when the pulse rate exceeds a predetermined value.

6. The film reader of claim 1 wherein the extreme braking means includes electromagnetic braking means associated with the drive means, and means responsive to the exclusive comparator means when correspondence is recognized for instantaneously applying a relatively narrow-high voltage pulse to the electromagnetic braking means.

7. The film reader of claim 6 including means for controlling the relatively high film speed to within predetermined limits.

8. The film reader of claim 7 wherein the film speed is controlled not to exceed a speed of approximately 125 - 150 inches per second.

9. The film reader of claim 6 wherein the amplitude of the high voltage pulse is substantially higher than the rated voltage of the electromagnetic braking means.

10. The film reader of claim 6 including a document mark associated with each document image, and means responsive to the document mark associated with the document image next following a corresponding code variation for stopping the film on the next document image, after correspondence is recognized and the high voltage pulse is applied.

11. The film reader of claim 1 wherein the high speed film rate is at least 100 inches per second.

12. A method of reading a film, the film having a plurality of document images thereon and code means before each document image or series of document images, the code means comprising one or more code variations each of which relates to the document images immediately following, comprising the steps of driving the film at a relatively high speed in a given direction, comparing a selected code variation with the code variations on the film, instantaneously applying an extreme braking force to the film drive when correspondence between the selected code and a code variation on the film is recognized to slow the film with the film moving in the same direction, said applying step comprising generating a relatively narrow-high voltage pulse when correspondence is recognized between the selected code and a code variation on the film, and applying the pulse to electromagnetically brake the film to slow the film and stopping the film on the next document without overrunning the document.

13. The film reader of claim 12 wherein the high speed film rate is at least 100 inches per second.

14. A method of reading a film, the film having a plurality of document images thereon and code means before each document image or series of document images, the code means comprising one or more code variations each of which relates to the document images immediately following, comprising the steps of driving the film at a relatively high speed in a given direction, comparing a selected code variation with the code variations on the film, instantaneously applying an extreme braking force to the film drive when correspondence between the selected code and a code variation on the film is recognized, said applying step comprising generating a relatively narrow-high voltage pulse when correspondence between the selected code and code variation of the film is recognized, applying the pulse to instantaneously reduce the speed of the film to a relatively low speed, driving the film at this relatively low speed for a finite distance in the same direction it was traveling at the relatively high speed, and then stopping the film on the next document without overrunning the document.

15. The method of claim 14 wherein the close proximity of some of the code variations on the film to their related document images is such that the total distance the film travels after correspondence is recognized until it stops on the next document may be less than one inch.

16. A film reader for use with film having a plurality of document images thereon and code means before each document image or series of document images, the code means comprising one or more code variations each of which relates to the document images immediately following, the reader comprising means for driving the film at a relatively high speed, means for programming a selected code variation, means for reading each code variation on the film, exclusive comparator means responsive to the programming means and the reading means for generating a HIT signal when correspondence between the programmed code variation and a code variation on the film is obtained, electromagnetic braking means associated with the drive means, means responsive to the HIT signal for generating a relatively narrow-high voltage pulse, the amplitude of the pulse being high relative to the rated voltage of the electromagnetic braking means, means for applying the high voltage pulse to the electromagnetic braking means, and means for stopping the film on the next document after the high voltage pulse is applied without overrunning the document.

17. The film reader of claim 16 wherein the width of the high voltage pulse is approximately between 1 and 100 miliseconds.

18. The film reader of claim 16 wherein the close proximity of some of the code variations on the film to their related document images is such that the distance the film travels after an HIT signal is generated until it stops on the next document may be less than one inch.

19. The film reader of claim 16 including means for controlling the relatively high film speed to within predetermined limits.

20. The film of claim 16 wherein the high speed film rate is at least 100 inches per second.

* * * * *